(12) United States Patent
Dykstra et al.

(10) Patent No.: US 10,669,834 B2
(45) Date of Patent: Jun. 2, 2020

(54) GAME THEORETIC CONTROL ARCHITECTURE FOR DRILLING SYSTEM AUTOMATION

(71) Applicant: HALLIBURTON ENERGY SERVICES INC., Houston, TX (US)

(72) Inventors: Jason D. Dykstra, Spring, TX (US); Qiuying Gu, Humble, TX (US); Yuzhen Xue, Tulsa, OK (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 312 days.

(21) Appl. No.: 15/576,104

(22) PCT Filed: Feb. 18, 2016

(86) PCT No.: PCT/US2016/018477
§ 371 (c)(1),
(2) Date: Nov. 21, 2017

(87) PCT Pub. No.: WO2017/142540
PCT Pub. Date: Aug. 24, 2017

(65) Prior Publication Data
US 2018/0135401 A1 May 17, 2018

(51) Int. Cl.
*E21B 44/00* (2006.01)
*E21B 3/02* (2006.01)
(Continued)

(52) U.S. Cl.
CPC .............. *E21B 44/00* (2013.01); *E21B 3/02* (2013.01); *E21B 7/04* (2013.01); *E21B 21/08* (2013.01);
(Continued)

(58) Field of Classification Search
CPC ....................................................... E21B 44/00
See application file for complete search history.

(56) References Cited

U.S. PATENT DOCUMENTS 9,031,674 B2 * 5/2015 Rashid .................... E21B 43/00
166/250.15
2003/0220742 A1 11/2003 Niedermayr et al.
(Continued)

FOREIGN PATENT DOCUMENTS

WO 2008139171 A2 11/2008
WO 2015030820 A1 3/2015
(Continued)

OTHER PUBLICATIONS

Mars et al., Game Theory Application for Hydraulic Fracture Design, SPE 87018, Society of Petroleum Engineers Inc., SPE Asia Pacific Conference on Integrated Modelling for Asset Management, Mar. 29-30, Kuala Lumpur, Malaysia.
(Continued)

*Primary Examiner* — Shane Bomar
(74) *Attorney, Agent, or Firm* — Polsinelli PC

(57) ABSTRACT

A drilling apparatus including plurality of subsystems, each subsystem includes a subsystem controller, one or more sensors, and one or more actuators. Each subsystem controller is configured to determine a local subsystem state from measurements received from the one or more sensors and further configured to receive global state estimates and updated control strategies. Each subsystem controller is configured to send command signals to one or more actuators based at least in part on the local subsystem state, global state estimates, and updated control strategy. A method and system for coordinating the control of a plurality of drilling subsystems during drilling operations is provided. A method of drilling subsystem controller decision-making based on a co-player inference playing strategy is further provided.

16 Claims, 7 Drawing Sheets

(51) Int. Cl.
*E21B 7/04* (2006.01)
*E21B 21/08* (2006.01)
*E21B 44/04* (2006.01)
*G05B 19/042* (2006.01)
*E21B 21/06* (2006.01)
*E21B 47/024* (2006.01)
*E21B 47/06* (2012.01)
*E21B 47/18* (2012.01)
*E21B 49/00* (2006.01)

(52) U.S. Cl.
CPC .......... *E21B 44/04* (2013.01); *G05B 19/0426* (2013.01); *E21B 21/062* (2013.01); *E21B 21/065* (2013.01); *E21B 47/024* (2013.01); *E21B 47/06* (2013.01); *E21B 47/18* (2013.01); *E21B 49/00* (2013.01); *G05B 2219/25083* (2013.01); *G05B 2219/25425* (2013.01); *G05B 2219/45129* (2013.01)

(56) References Cited

U.S. PATENT DOCUMENTS

| | | | |
|---|---|---|---|
| 2007/0271077 | A1 | 11/2007 | Kosmala et al. |
| 2009/0132458 | A1 | 5/2009 | Edwards et al. |
| 2015/0105912 | A1 | 4/2015 | Dykstra |
| 2015/0275646 | A1 | 10/2015 | Benson et al. |
| 2016/0108698 | A1* | 4/2016 | Alvarez .................. E21B 33/14 166/285 |
| 2018/0156023 | A1* | 6/2018 | Dykstra .................... E21B 7/04 |

FOREIGN PATENT DOCUMENTS

| | | |
|---|---|---|
| WO | 2015057242 A1 | 4/2015 |
| WO | 2015084402 A1 | 6/2015 |
| WO | 2015084405 A1 | 6/2015 |
| WO | 2015102792 A1 | 7/2015 |
| WO | 2015137931 A1 | 9/2015 |

* cited by examiner ations.
GAME THEORETIC CONTROL ARCHITECTURE FOR DRILLING SYSTEM AUTOMATION

CROSS-REFERENCE TO RELATED APPLICATIONS

This application is a national stage entry of PCT/US2016/018477 filed Feb. 18, 2016, said application is expressly incorporated herein in its entirety.

FIELD

The present disclosure relates to drilling subterranean wellbores. In particular, the present disclosure relates to the coordination of drilling subsystems during drilling operations.

BACKGROUND

Wellbores are drilled into the earth for a variety of purposes including tapping into hydrocarbon bearing formations to extract the hydrocarbons for use as fuel, lubricants, chemical production, and other purposes. Systems for drilling subterranean wellbores can be complex often involving multiple subsystems. For instance, a drilling system may include a rig subsystem, a drilling fluid subsystem, and a bottom hole assembly (BHA) subsystem. Each drilling subsystem typically collects measurements from sensors to detect various parameters related to the drilling process. Drilling systems are generally characterized by subsystem equipment and measurement devices spread over large distances, which involves communication delays and bandwidth issues. For instance, sensor measurement data collected near the bottom hole assembly (BHA) is typically transmitted to the surface where it is analyzed and used to adjust downhole drilling equipment. Mud pulsing, a common form of communication between the rig at the surface and the BHA, is bandwidth limited and delayed, making controlling the drilling process difficult. Additionally, downhole sensor measurements and surface sensor measurements alike can be inaccurate, delayed, or infrequent, limiting the effectiveness of using such measurements in drilling control systems. Effective control over the drilling process is further complicated as a result of interactions between the plurality of drilling subsystems. For instance, manipulation of drilling variables by each of the individual drilling subsystems can affect the measurements and control requirements of neighboring drilling subsystems.

BRIEF DESCRIPTION OF THE DRAWINGS

In order to describe the manner in which the advantages and features of the disclosure can be obtained, reference is made to embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Figure 1:
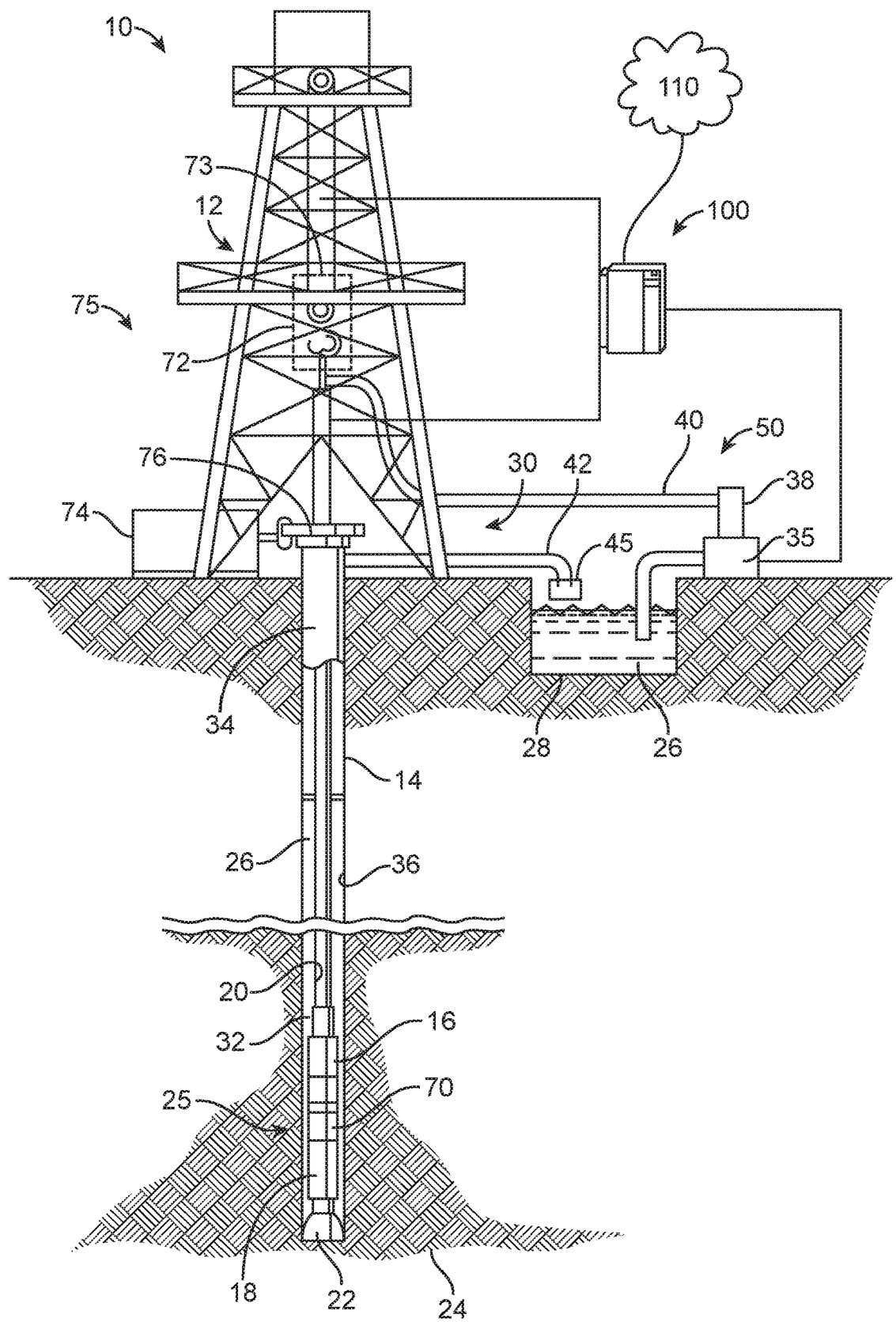
FIG. 1 is a schematic view of a wellbore operating environment in which a drilling apparatus, method, and system may be deployed, according to an exemplary embodiment.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

It should be understood at the outset that although illustrative implementations of one or more embodiments are illustrated below, the disclosed compositions and methods may be implemented using any number of techniques. The disclosure should in no way be limited to the illustrative implementations, drawings, and techniques illustrated herein, but may be modified within the scope of the appended claims along with their full scope of equivalents.

Unless otherwise specified, any use of any form of the terms "connect," "engage," "couple," "attach," or any other term describing an interaction between elements is not meant to limit the interaction to direct interaction between the elements and also may include indirect interaction between the elements described. In the following discussion and in the claims, the terms "including" and "comprising" are used in an open-ended fashion, and thus should be interpreted to mean "including, but not limited to . . . ". Reference to up or down will be made for purposes of description with "up," "upper," "upward," "upstream," or "uphole" meaning toward the surface of the wellbore and with "down," "lower," "downward," "downstream," or "downhole" meaning toward the terminal end of the well, regardless of the wellbore orientation. The various characteristics described in more detail below, will be readily apparent to those skilled in the art with the aid of this disclosure upon reading the following detailed description, and by referring to the accompanying drawings.

The present disclosure generally relates to an apparatus, method, and system for coordinating the control of a plurality of drilling subsystems during drilling operations. The drilling apparatus includes a plurality of subsystems in which each subsystem includes a subsystem controller, one or more sensors, and one or more actuators. Each subsystem controller is configured to determine a local subsystem state from measurements received from the one or more sensors and further configured to receive global state estimates based at least in part on the local subsystem states of each of the plurality of subsystems. Each subsystem controller is also configured to receive updated control strategies based at least in part on the global state estimates. The subsystem controllers are further configured to send command signals to the one or more actuators based on the local subsystem state, global state estimates, and the updated control strategy.

In at least one aspect of the present disclosure, the apparatus further includes a communication coordinator communicatively coupled with each of the plurality of subsystem controllers. The communication coordinator is configured to receive local subsystem states and local controller command signals sent to one or more subsystem actuators. The communication coordinator is also configured to transmit global state estimates to each of the plurality of subsystem controllers.

In at least one aspect of the present disclosure, the apparatus further includes a global state estimator communicatively coupled with the communication coordinator. The global state estimator is configured to determine global state estimates based at least in part on the local subsystem states of each of the plurality of subsystems and the command signals sent by each of the subsystem controllers to one or more subsystem actuators. The global state estimator is further configured to transmit the global state estimates to the communication coordinator for transmitting to each of the plurality of subsystem controllers.

In at least one aspect of the present disclosure, the apparatus further includes a global strategy controller communicatively coupled with the global state estimator and each of the plurality of subsystem controllers. The global strategy controller is configured to receive and evaluate the global state estimates to determine updated control strategies required to achieve a performance objective of the apparatus. The global strategy controller is further configured to transmit the updated control strategies to the plurality of subsystem controllers.

In another aspect of the present disclosure, a method of controlling a plurality of drilling subsystems is provided. The method includes providing a drilling system that includes a plurality of subsystems, with each subsystem including a controller communicatively coupled with one or more sensors and one or more actuators. The method further includes determining, at each subsystem controller, a local subsystem state from measurements received from the one or more sensors. The method additionally includes obtaining a global estimate based at least in part on the local subsystem states and command signals sent by each subsystem controller to the one or more actuators. The method further includes evaluating the global state estimates to determine updated control strategies required to achieve the performance objective of the system. The method additionally includes communicating the updated control strategies to each of the plurality of subsystem controllers and actuating, at each of the plurality of subsystems, one or more actuators to adjust a drilling subsystem control variable in response to the updated control strategies.

In another aspect of the present disclosure, a method of controlling a drilling subsystem based at least in part upon the expected control actions of neighboring subsystems is provided. The method includes providing a drilling system that includes a plurality of subsystems, each subsystem comprising a subsystem controller communicatively coupled with one or more sensors and one or more actuators. The method further includes determining, at each subsystem controller, a local subsystem state from measurements received from the one or more sensors. The method additionally includes actuating, at each of the plurality of subsystems, one or more actuators to adjust a drilling subsystem control variable in response to a control action taken by a subsystem controller. The method further includes obtaining, at an individual subsystem controller, global state estimates based at least in part on the local subsystem states and control actions taken by each of the subsystem controllers. The method additionally includes evaluating, at the individual subsystem controller, the global state estimates to determine expected control actions of other subsystems. The method further includes producing, at the individual subsystem controller, an uncorrected command signal based at least in part on the expected control actions of other subsystems. Additionally, the method includes receiving, at the individual subsystem controller, the actual control actions of other subsystems. The method also includes determining, at the individual subsystem controller, an estimated error based at least in part on the expected control actions of other subsystems and the actual control actions of other subsystems. The method further includes generating, at the individual subsystem controller, a compensation signal based at least in part on the estimated error. The method also includes adding the compensation signal to the uncorrected command signal to produce a corrected command signal and actuating one or more actuators to adjust a drilling subsystem control variable in response to the corrected command signal.

In at least one aspect of the present disclosure, the method further includes updating, at the individual subsystem controller, an evaluation algorithm used to determine the expected control actions of other subsystems based at least in part on the estimated error.

In another aspect of the present disclosure, a drilling system is provided. The system includes a plurality of drilling subsystems, each drilling subsystem including a subsystem controller, one or more sensors, and one or more actuators. Each subsystem controller is configured to determine a local subsystem state from measurements received from the one or more sensors. The system further includes a communication coordinator communicatively coupled with each of the plurality of subsystem controllers and configured to receive local subsystem states from each of the plurality of subsystem controllers. The communication coordinator is further configured to receive, from each of the plurality of subsystem controllers, command signals sent by each subsystem controller to one or more actuators. The system further includes a global state estimator communicatively coupled with the communication coordinator and configured to determine global state estimates based at least in part on the local subsystem states and the command signals received from the communication coordinator. The global state estimator is further configured to transmit global estimates to the communication controller. The system further includes a global strategy controller communicatively coupled with the global state estimator and each of the plurality of subsystem controllers. The global strategy controller is configured to receive and evaluate the global state estimates to determine updated control strategies required to achieve the performance objective of the drilling system. The global strategy controller is further configured to communicate the updated control strategies to each of the plurality of subsystem controllers. Each subsystem controller in the system is configured to send command signals to the one or more actuators based at least in part on the local subsystem state, global state estimates received from the communication coordinator, and the updated control strategy.

In at least one aspect of the present disclosure, apparatus, methods, and systems for coordinating the control of a plurality of drilling subsystems based at least in part on a distributed control architecture, are provided. In at least one aspect of the present disclosure, a method of coordinating the control actions of a plurality of individual drilling subsystem controllers based on concepts from game theory is provided. The presently disclosed apparatus, methods, and systems of coordinating the control actions of drilling subsystems are well-suited to, among other operating conditions, communications environments in which communication between the plurality of drilling subsystems is limited or delayed, such as may result from large geographic spread of equipment, the use of mud pulse telemetry, and other operating conditions resulting in the delayed availability of sensor measurements.

FIG. 1 illustrates a schematic view of an embodiment of a wellbore operating environment 10 in which a drilling control apparatus, method, and system may be deployed in accordance with certain embodiments of the present disclosure. The wellbore operating environment 10 includes a plurality of drilling subsystems. For example, FIG. 1 depicts the wellbore operating environment 10 as including a bottom hole assembly (BHA) subsystem 25, drilling fluid subsystem 50, and a rig subsystem 75. However, the wellbore operating environment 10 may include any number of subsystems so long as there are a plurality of subsystems. Additionally, each of the subsystems illustrated in FIG. 1 may be further divided into additional subsystems or may themselves be included in other subsystems without departing from the scope and spirit of the present disclosure.

As depicted in FIG. 1, the wellbore operating environment 10 may include a drilling rig 12 disposed atop a borehole 14. The drilling rig 12 includes a drill string 20 disposed within the borehole 14. A BHA subsystem 25 is located at the downhole end of the drill string 20. The BHA subsystem 25 includes a drill bit 22 that carves a borehole 14 through earth formations 24. The BHA subsystem 25 further includes a fluid-driven motor assembly 70 that drives drill bit 22. The BHA subsystem 25 may provide directional control of the drill bit 22. In at least one aspect of the present disclosure, the drill bit 22 is a rotatable drill bit and the BHA subsystem is a steerable drilling BHA subsystem 25 that includes a Measurement While Drilling (MWD) system with various sensors 18 to provide information about formations 24 and downhole drilling parameters. The MWD sensors in the BHA subsystem 25 may include, but are not limited to, a device for measuring the formation resistivity near the drill bit, a gamma ray device for measuring the formation gamma ray intensity, devices for determining the inclination and azimuth of the drill string, and pressure sensors for measuring drilling fluid pressure downhole. The MWD sensors may also include additional/alternative sensing devices for measuring shock, vibration, torque, telemetry, etc. The BHA subsystem 25 may further include actuators capable of steering the drill bit 22 or otherwise adjusting the path direction of the drill bit 22 and drill string 20. In at least one aspect of the present disclosure, the BHA subsystem 25 includes a subsystem controller capable of processing data obtained from sensors 18 to adjust the path direction of the drill bit 22 and drill string 20 by sending command signals to one or more actuators capable of adjusting or controlling the path direction. The sensors 18 may transmit data to a surface control unit 100 on the earth's surface using telemetry such as conventional mud pulse telemetry systems or any wired, fiber optic, or wireless communication system. The surface control unit 100 may process or further communicate the sensor data in accordance with the embodiments of the present disclosure as described herein.

In at least one aspect of the present disclosure, the BHA subsystem 25 may include a Logging While Drilling (LWD) System with additional sensors or logging tools 16. The logging tools, sensors, or instruments 16, can be any conventional logging instrument such as acoustic (sometimes referred to as sonic), neutron, gamma ray, density, photoelectron, nuclear magnetic resonance, or any other conventional logging instrument, or combinations thereof, which can be used to measure lithology or porosity of formations surrounding an earth borehole. The sensors or logging tools 16 may transmit data to a surface control unit 100 on the earth's surface using telemetry such as conventional mud pulse telemetry systems or any wired, fiber optic, or wireless communication system. The surface control unit 100 may process or further communicate the sensor data in accordance with the embodiments of the present disclosure as described herein.

The BHA subsystem 25 may additionally include sensors in conjunction with the fluid-driven motor 70 that monitors the revolutions per minute (RPM) of the motor 70 and that identifies changes in torque or power needed by the motor to maintain constant rotation, such as a torque meter. Such sensors may be internal or external to the fluid-driven motor 70.

In addition to MWD and LWD sensors and instrumentation, wireline instrumentation may also be used in conjunction with the BHA subsystem 25. The wireline instrumentation may include any conventional logging instrumentation which can be used to measure the lithology and/or porosity of formations surrounding an earth borehole, for example, such as acoustic, neutron, gamma ray, density, photoelectric, nuclear magnetic resonance, or any other conventional logging instrument, or combinations thereof, which can be used to measure lithology.

As depicted in FIG. 1, a drilling fluid subsystem 50 pumps drilling mud 26 from a storage reservoir pit 28 near the wellhead 30, down an axial passageway (not illustrated) through the drill string 20, through the fluid-driven motor assembly 70, and out of apertures in the drill bit 22. After exiting the apertures in the drill bit 22, the drilling mud 26 flows back to the surface through the annular region 32 between the drill string 20 and the sidewalls 36 of the borehole 14. Metal casing 34 may be positioned in the borehole 14 above the drill bit 22 for maintaining the integrity of an upper portion of the borehole 14 and for preventing fluid transmission between borehole 14 and formations 24. The annular region 32 between the drill string 20 and the sidewalls 36 of the borehole 14 forms the return flow path for the drilling mud 26.

The drilling fluid subsystem 50 causes drilling mud 26 to be pumped from the mud storage pit 28 near the well head 30 by one or more pumps 38. The drilling fluid subsystem 50 may include one or more sensors capable of measuring the pumping rate or the downhole drilling fluid flow rate. The drilling fluid subsystem 50 may further include one or more actuators capable of adjusting or controlling the pumps 38, including the pumping rate or the downhole drilling fluid flow rate. The drilling mud may travel through a mud supply line 40 which is coupled with a central passageway extending throughout the length of the drill string 20 and exits into the borehole through apertures in the drill bit 22 for cooling and lubricating the drill bit and carrying the formation cuttings produced during the drilling operation back to the surface. The cuttings and mud mixture is passed through a fluid exhaust conduit 42, coupled with the annular region 32 at the well head 30, and into a trough system 45 that includes shakers and an optional centrifuge (not shown). The shakers separate a majority of solids, such as cuttings and fines, from the drilling mud. Cleaned mud is then returned to the mud storage pit 28.

The drilling fluid subsystem 50 may include sensors capable of analyzing the nature as well as the volume, quantity, or weight of the cuttings and fines being removed by the shaker included in the trough system 45. Additionally, the drilling fluid subsystem 50 may include sensors capable of determining the particle size distribution (PSD) of the cuttings, the density of the cuttings, and/or visual characteristics of the cuttings. For example, the drilling fluid subsystem 50 may include sensors capable of determining that the cuttings are not being efficiently cleaned out of the hole, which could in turn cause the drill bit 22 or drill string 20 to get stuck downhole. Numerous other problems and corrective actions may be similarly identified based on particular surrounding circumstances and measurements made by the drilling fluid subsystem 50 sensors. For example, a greater than expected amount of fluid could indicate an inefficiency of the shakers that could be corrected by various adjustments, such as changes to the screen desk angle, vibration, G-force and cuttings conveyance velocity. The drilling fluid subsystem 50 may include actuators capable of adjusting or controlling the performance of the shakers or optional centrifuges. For example, the drilling fluid subsystem 50 may include actuators capable of adjusting or controlling shaker parameters such as screen desk angle, vibration, and G-force.

The drilling fluid subsystem 50 may further include one or more sensors capable of determining the fluid properties of the drilling fluid. In conjunction with drilling fluid property sensors, the drilling fluid subsystem 50 may also include one or more mixers 35 capable of controlling the drilling fluid properties by mixing mud obtained from the mud storage pit with appropriate additives. For example, the mixers 35 of the drilling fluid subsystem 50 may control the rheological properties of the drilling fluid as well as the density, mud equivalent circulating density (ECD), electrical stability, percent solids, oil/water ratio, acidity (pH), salinity, and particle size distribution. The drilling fluid subsystem 50 may include one or more actuators capable of controlling the properties of the drilling fluid. For example, actuators included in the drilling fluid subsystem 50 may control additive supply valves, feed rates, mixture composition, discharge rates, and other aspects of the mixing process.

As used herein, the term "drilling mud" may be used interchangeably with "drilling fluid" to refer to both drilling mud alone and a mixture of drilling mud and formation cuttings, or alternatively, to refer to both drilling fluid alone and a mixture of drilling fluid and formation cuttings.

The wellbore operating environment 10 may further include a rig subsystem 75. The rig subsystem 75 may include a top drive motor 72, a draw works 73, a rotary table 76, and a rotary table motor 74. The rotary table motor 74 may rotate the drill string, or alternatively the drill string may be rotated via a top drive motor 72. The rig subsystem 75 at least in part drives the drill bit 22 of the BHA subsystem 25 by providing sufficient weight-on-bit (WOB), revolutions per minute (RPM) and torque to create the hole. The rig subsystem 75 may include one or more sensors capable of measuring, for instance, revolutions per minute (RPM), weight-on-bit (WOB), torque-on-bit (TOB), rate of penetration (ROP), well depth, hook load, and/or standpipe pressure. Additionally, the rig subsystem 75 includes actuators capable of adjusting or controlling drilling parameters such as RPM, WOB, TOB, and ROP. For example, the hook load and top drive rotational speed may be changed over time by one or more actuators.

Figure 2:
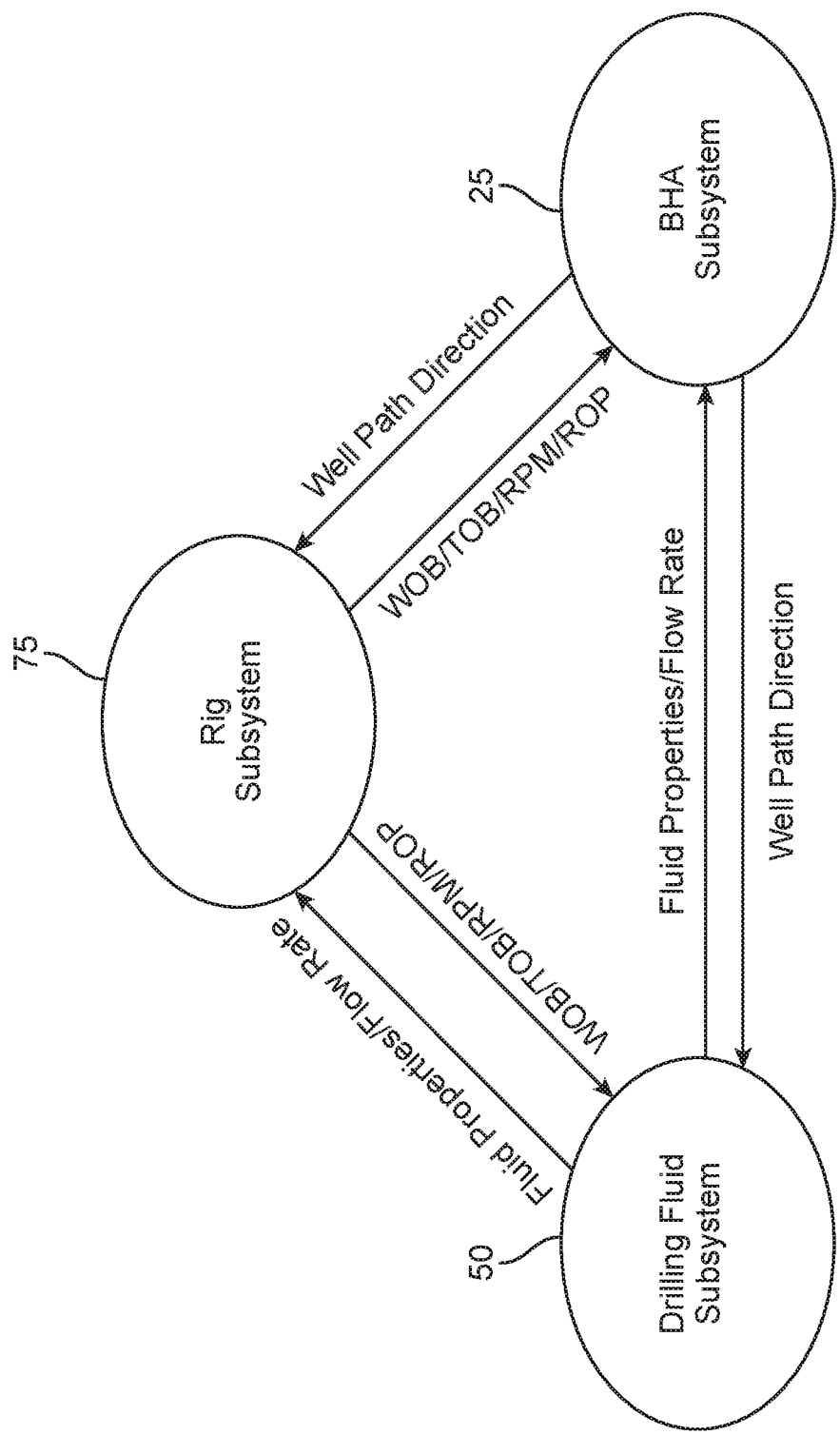
FIG. 2 is an illustration depicting the interactions between a rig subsystem, a drilling fluid subsystem, and a bottom hole assembly (BHA) subsystem, according to an exemplary embodiment.

As depicted in FIG. 2, control actions taken by any of the individual drilling subsystems may affect the performance of the other drilling subsystems. For example, the drilling fluid subsystem 50 provides drilling mud that is circulated downhole for the purpose of cooling the bit and transporting the bit cuttings to the surface for disposal. The drilling fluid subsystem 50 includes a mud conditioning system that processes the circulated drilling fluid with shakers, centrifuges, or other cuttings removal equipment. Before the drilling fluid is recirculated, make-up water and other additives are added to the drilling fluid to obtain the desired density and rheological profile. Therefore, the drilling fluid subsystem 50 directly determines the drilling fluid flow rate (downhole pumping rate) and the properties of the drilling fluid (e.g., the rate of additive and make-up water addition as well as settings on the cuttings removal equipment). The drilling fluid properties and downhole drilling fluid flow rate, in turn, may affect the performance and control parameters of the neighboring rig subsystem 75 and BHA subsystem 25. For example, the drilling fluid properties and flow rate may determine in part the ability of the BHA subsystem 25 to effectively control the well path direction. The drilling fluid properties and flow rate may also affect the rig subsystem 75 control parameters, such as weight-on-bit (WOB), torque-on-bit (TOB), or revolutions per minute (RPM), necessary to create the borehole or achieve the desired rate of penetration (ROP).

Similarly, a change in the well path direction, as controlled by the BHA subsystem 25, may require changes, for example, in the drilling fluid properties or drilling fluid flow rate controlled by the drilling fluid subsystem 50. The well path direction controlled by the BHA subsystem 25 may additionally affect the rig subsystem 75 control decisions. Likewise, the rig subsystem's 75 manipulated variables, such as WOB and RPM, may affect the control behaviors of the BHA subsystem 25 and the drilling fluid subsystem 50.

Referring back to FIG. 1, each subsystem can include a subsystem controller that is communicatively coupled with at least one subsystem sensor and at least one subsystem actuator. The subsystem controller is capable of receiving measurement data collected by subsystem sensors and determining a local subsystem state from measurements received from the subsystem sensors. As used herein, the "local subsystem state" refers to a time-dependent subsystem state or set of subsystem states that may be directly measured by a sensor or calculated or estimated, at least in part, from one or more sensor measurements.

The subsystem controller is also capable of sending command signals to subsystem actuators to cause the actuators to adjust or control one or more drilling control parameters. Actuators can convert the command signals from control systems into actions such as movement of a control valve shaft or the change of speed of a pump. Command signals to actuators can at least be electrical, pneumatic, hydraulic, acoustic, or electromagnetic radiation, or various combinations thereof. Actuators can at least be of various kinds, including variable speed motors, variable speed drives, pneumatic actuators, electrical actuators, hydraulic actuators, rotary actuators, servo motor actuators, or various combinations thereof. In some cases, the subsystem controller may send command signals to a lower level controller capable of causing actuation of an actuator to adjust or modify a drilling control parameter in accordance with the command signal sent by the subsystem controller. The lower level controllers may be relatively simple controllers such as a proportional-integral-derivative (PID) type controller and/or a control loop feedback mechanism controller.

Figure 3A:
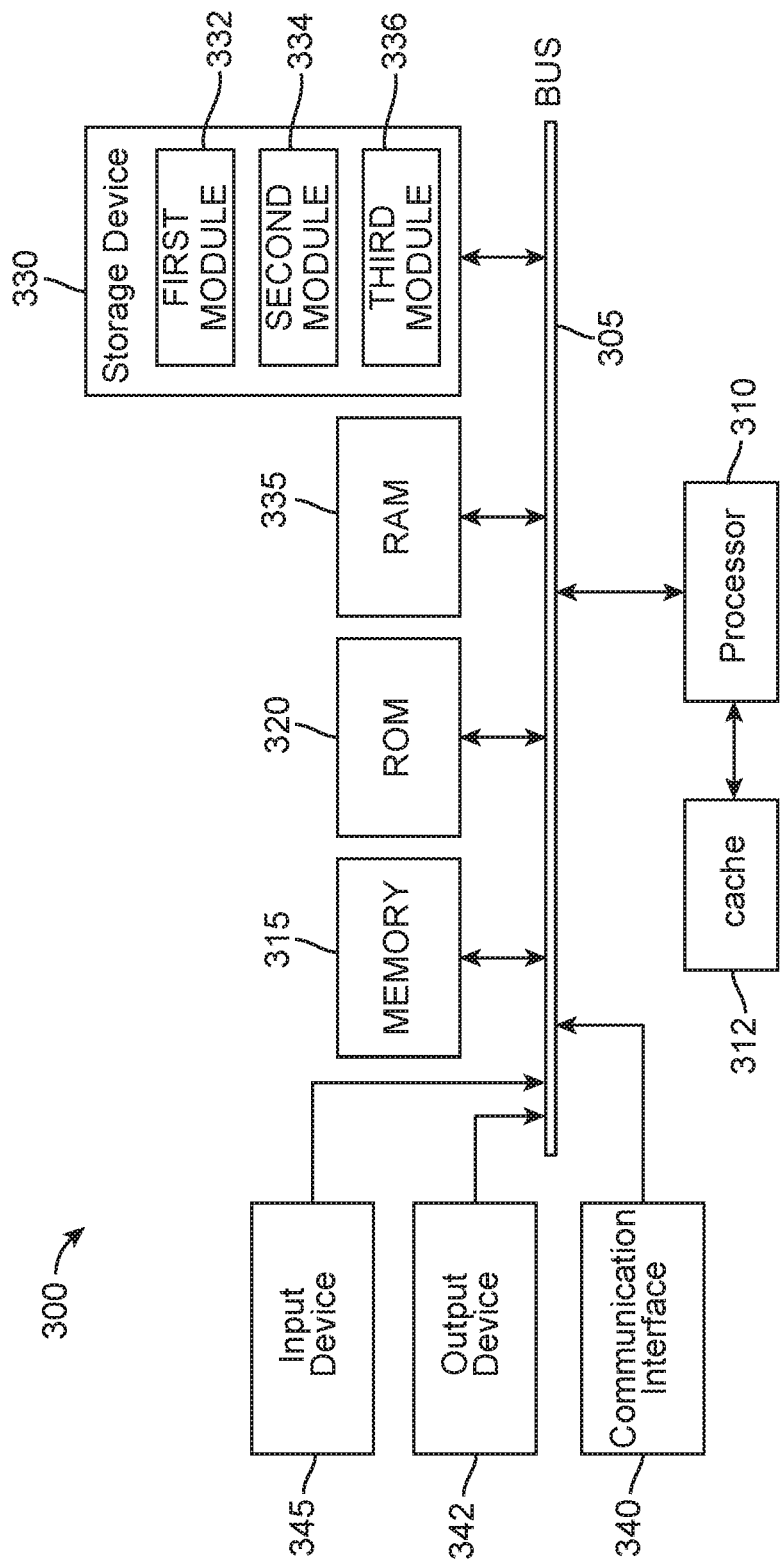
FIG. 3A is an illustration depicting a conventional system bus computing system architecture, according to an exemplary embodiment.
Figure 3B:
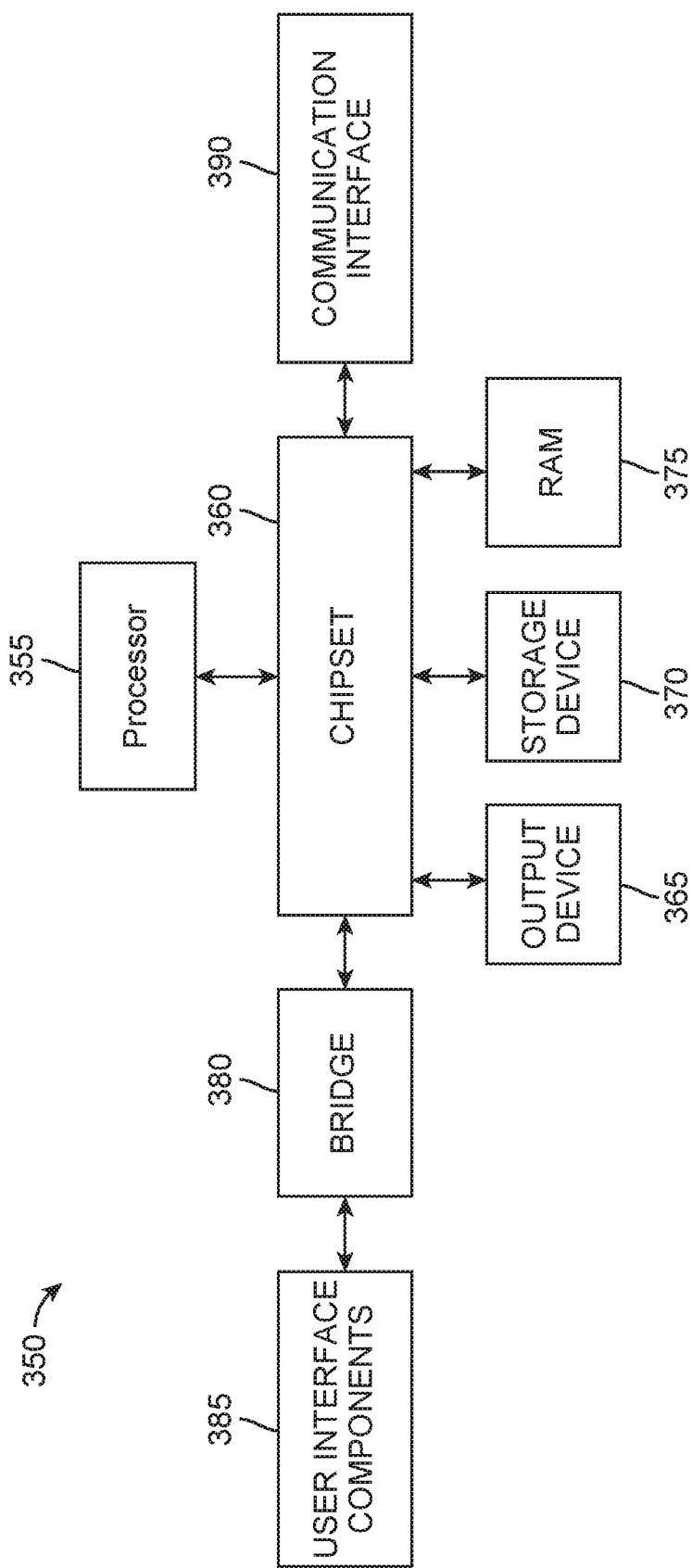
FIG. 3B is an illustration depicting a computer system having a chipset architecture, according to an exemplary embodiment.

The subsystem controller may include any suitable computer, controller, or data processing apparatus capable of being programmed to carry out the method and apparatus as further described herein. FIGS. 3A and 3B illustrate exemplary subsystem controller embodiments which can be employed to practice the concepts, methods, and techniques disclosed herein. The more appropriate embodiment will be apparent to those of ordinary skill in the art when practicing the present technology. Persons of ordinary skill in the art will also readily appreciate that other system embodiments are possible.

FIG. 3A illustrates a conventional system bus computing system architecture 300 wherein the components of the system are in electrical communication with each other using a bus 305. System 300 can include a processing unit (CPU or processor) 310 and a system bus 305 that couples various system components including the system memory 315, such as read only memory (ROM) 320 and random access memory (RAM) 335, to the processor 310. The system 300 can include a cache of high-speed memory connected directly with, in close proximity to, or integrated as part of the processor 310. The system 300 can copy data from the memory 315 and/or the storage device 330 to the cache 312 for quick access by the processor 310. In this way, the cache 312 can provide a performance boost that avoids processor 310 delays while waiting for data. These and other modules can control or be configured to control the processor 310 to perform various actions. Other system memory 315 may be available for use as well. The memory 315 can include multiple different types of memory with different performance characteristics. It can be appreciated that the disclosure may operate on a computing device 300 with more than one processor 310 or on a group or cluster of computing devices networked together to provide greater processing capability. The processor 310 can include any general purpose processor and a hardware module or software module, such as first module 332, second module 334, and third module 336 stored in storage device 330, configured to control the processor 310 as well as a special-purpose processor where software instructions are incorporated into the actual processor design. The processor 310 may essentially be a completely self-contained computing system, containing multiple cores or processors, a bus, memory controller, cache, etc. A multi-core processor may be symmetric or asymmetric.

The system bus 305 may be any of several types of bus structures including a memory bus or a memory controller, a peripheral bus, and a local bus using any of a variety of bus architectures. A basic input/output (BIOS) stored in ROM 320 or the like, may provide the basic routine that helps to transfer information between elements within the computing device 300, such as during start-up. The computing device 300 further includes storage devices 330 or computer-readable storage media such as a hard disk drive, a magnetic disk drive, an optical disk drive, tape drive, solid-state drive, RAM drive, removable storage devices, a redundant array of inexpensive disks (RAID), hybrid storage device, or the like. The storage device 330 can include software modules 332, 334, 336 for controlling the processor 310. The system 300 can include other hardware or software modules. The storage device 330 is connected to the system bus 305 by a drive interface. The drives and the associated computer-readable storage devices provide non-volatile storage of computer-readable instructions, data structures, program modules and other data for the computing device 300. In one aspect, a hardware module that performs a particular function includes the software components shorted in a tangible computer-readable storage device in connection with the necessary hardware components, such as the processor 310, bus 305, and so forth, to carry out a particular function. In the alternative, the system can use a processor and computer-readable storage device to store instructions which, when executed by the processor, cause the processor to perform operations, a method or other specific actions. The basic components and appropriate variations can be modified depending on the type of device, such as whether the device 300 is a small, handheld computing device, a desktop computer, or a computer server. When the processor 310 executes instructions to perform "operations", the processor 310 can perform the operations directly and/or facilitate, direct, or cooperate with another device or component to perform the operations.

To enable user interaction with the computing device 300, an input device 345 can represent any number of input mechanisms, such as a microphone for speech, a touch-sensitive screen for gesture or graphical input, keyboard, mouse, motion input, speech and so forth. An output device 342 can also be one or more of a number of output mechanisms known to those of skill in the art. In some instances, multimodal systems can enable a user to provide multiple types of input to communicate with the computing device 300. The communications interface 340 can generally govern and manage the user input and system output. There is no restriction on operating on any particular hardware arrangement and therefore the basic features here may easily be substituted for improved hardware or firmware arrangements as they are developed.

Storage device 330 is a non-volatile memory and can be a hard disk or other types of computer readable media which can store data that are accessible by a computer, such as magnetic cassettes, flash memory cards, solid state memory devices, digital versatile disks (DVDs), cartridges, RAMs 325, ROM 320, a cable containing a bit stream, and hybrids thereof.

The logical operations for carrying out the disclosure herein may include: (1) a sequence of computer implemented steps, operations, or procedures running on a programmable circuit with a general use computer, (2) a sequence of computer implemented steps, operations, or procedures running on a specific-use programmable circuit; and/or (3) interconnected machine modules or program engines within the programmable circuits. The system 300 shown in FIG. 3A can practice all or part of the recited methods, can be a part of the recited systems, and/or can operate according to instructions in the recited tangible computer-readable storage devices.

One or more parts of the example computing device 300, up to and including the entire computing device 300, can be virtualized. For example, a virtual processor can be a software object that executes according to a particular instruction set, even when a physical processor of the same type as the virtual processor is unavailable. A virtualization layer or a virtual "host" can enable virtualized components of one or more different computing devices or device types by translating virtualized operations to actual operations. Ultimately however, virtualized hardware of every type is implemented or executed by some underlying physical hardware. Thus, a virtualization compute layer can operate on top of a physical compute layer. The virtualization compute layer can include one or more of a virtual machine, an overlay network, a hypervisor, virtual switching, and any other virtualization application.

The processor 310 can include all types of processors disclosed herein, including a virtual processor. However, when referring to a virtual processor, the processor 310 includes the software components associated with executing the virtual processor in a virtualization layer and underlying hardware necessary to execute the virtualization layer. The system 300 can include a physical or virtual processor 310 that receives instructions stored in a computer-readable storage device, which causes the processor 310 to perform certain operations. When referring to a virtual processor 310, the system also includes the underlying physical hardware executing the virtual processor 310.

FIG. 3B illustrates an example computer system 350 having a chipset architecture that can be used in executing the described method and generating and displaying a graphical user interface (GUI). Computer system 350 can be computer hardware, software, and firmware that can be used to implement the disclosed technology. System 350 can include a processor 355, representative of any number of physically and/or logically distinct resources capable of executing software, firmware, and hardware configured to perform identified computations. Processor 355 can communicate with a chipset 360 that can control input to and output from processor 355. Chipset 360 can output information to output device 365, such as a display, and can read and write information to storage device 370, which can include magnetic media, and solid state media. Chipset 360 can also read data from and write data to RAM 375. A bridge 380 for interfacing with a variety of user interface components 385 can include a keyboard, a microphone, touch detection and processing circuitry, a pointing device, such as a mouse, and so on. In general, inputs to system 350 can come from any of a variety of sources, machine generated and/or human generated.

Chipset 360 can also interface with one or more communication interfaces 390 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 355 analyzing data stored in storage 370 or RAM 375. Further, the machine can receive inputs from a user via user interface components 385 and execute appropriate functions, such as browsing functions by interpreting these inputs using processor 355.

It can be appreciated that systems 300 and 350 can have more than one processor 310, 355 or be part of a group or cluster of computing devices networked together to provide processing capability. For example, the processor 310, 355 can include multiple processors, such as a system having multiple, physically separate processors in different sockets, or a system having multiple processor cores on a single physical chip. Similarly, the processor 310 can include multiple distributed processors located in multiple separate computing devices, but working together such as via a communications network. Multiple processors or processor cores can share resources such as memory 315 or the cache 312, or can operate using independent resources. The processor 310 can include one or more of a state machine, an application specific integrated circuit (ASIC), or a programmable gate array (PGA) including a field PGA.

Methods according to the aforementioned description can be implemented using computer-executable instructions that are stored or otherwise available from computer readable media. Such instructions can comprise instructions and data which cause or otherwise configured a general purpose computer, special purpose computer, or special purpose processing device to perform a certain function or group of functions, portions of computer resources used can be accessible over a network. The computer executable instructions may be binaries, intermediate format instructions such as assembly language, firmware, or source code. Computer-readable media that may be used to store instructions, information used, and/or information created during methods according to the aforementioned description include magnetic or optical disks, flash memory, USB devices provided with non-volatile memory, networked storage devices, and so on.

For clarity of explanation, in some instances the present technology may be presented as including individual functional blocks including functional blocks comprising devices, device components, steps or routines in a method embodied in software, or combinations of hardware and software. The functions these blocks represent may be provided through the use of either shared or dedicated hardware, including, but not limited to, hardware capable of executing software and hardware, such as a processor 310, that is purpose-built to operate as an equivalent to software executing on a general purpose processor. For example, the functions of one or more processors represented in FIG. 3A may be provided by a single shared processor or multiple processors. (use of the term "processor" should not be construed to refer exclusively to hardware capable of executing software.) Illustrative embodiments may include microprocessor and/or digital signal processor (DSP) hardware, ROM 320 for storing software performing the operations described below, and RAM 335 for storing results. Very large scale integration (VLSI) hardware embodiments, as well as custom VLSI circuitry in combination with a general purpose DSP circuit, may also be provided.

The computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Devices implementing methods according to these disclosures can comprise hardware, firmware and/or software, and can take any of a variety of form factors. Such form factors can include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device.

The instructions, media for conveying such instructions, computing resources for executing them, and other structures for supporting such computing resources are means for providing the functions described in these disclosures.

Referring back to FIG. 1, the wellbore operating environment 10 can further include a surface control unit 100 communicatively coupled with one or more of the drilling subsystems. The surface control unit 100 may include any suitable computer, controller, or data processing apparatus capable of being programmed to carry out the method and apparatus as further described herein. FIGS. 3A and 3B illustrate exemplary surface control unit 100 embodiments which can be employed to practice the concepts, methods, and techniques disclosed herein. The more appropriate embodiment will be apparent to those of ordinary skill in the art when practicing the present technology. Persons of ordinary skill in the art will also readily appreciate that other system embodiments are possible.

As depicted in FIG. 1, the surface control unit 100 is communicatively coupled with the BHA subsystem 25, the drilling fluid subsystem 50, and the rig subsystem 75. In at least one aspect of the present disclosure, the surface control unit 100 is communicatively coupled with the subsystem controllers of each of the subsystems 25, 50, 75. The surface control unit 100 may be capable of receiving measurement data from one or more subsystem sensors as well as subsystem state data determined by subsystem controllers. Additionally, the surface control unit 100 may be capable of sending instructions to each of the subsystem controllers that may be used at least in part to control the subsystem actuators. In at least one aspect of the present disclosure, the surface control unit 100 may send instructions to each of the subsystem controllers sufficient to coordinate control of the drilling subsystems during drilling operations.

According to at least one aspect of the present disclosure, the surface control unit 100 may include a communication coordinator further described herein. The communication coordinator may coordinate the communication of data between the subsystem controllers of different subsystems and between the subsystem controllers and other components of the drilling system. The communication coordinator may be configured to receive local subsystem states and subsystem controller command actions from each of the plurality of subsystem controllers. The communication coordinator may be further configured to transmit global state estimates, that include local state estimates for each of the plurality of subsystems, to each of the subsystem controllers. The communication coordinator may also be configured to transmit actual subsystem controller command actions or signals, sent to the actuators of other subsystems, to each of the plurality of subsystem controllers.

According to at least one aspect of the present disclosure, the surface control unit 100 may include a global state estimator further described herein. The global state estimator may be configured to determine global state estimates based at least in part on the local subsystem states of each of the plurality of subsystems. The global state estimator may be further configured to transmit the global state estimates to the communication coordinator so that the global state estimates may be shared with each of the plurality of subsystem controllers.

According to at least one aspect of the present disclosure, the surface control unit 100 may include a global strategy controller further described herein. The global strategy controller may be configured to receive and evaluate the global state estimates to determine updated control strategies required to achieve a performance objective of the apparatus. The global strategy controller may be further configured to transmit the updated control strategies to the plurality of subsystem controllers.

According to at least one aspect of the present disclosure, the surface control unit 100 may include the rig subsystem controller and/or the drilling fluid subsystem controller.

The surface control unit 100 is characterized in that it is capable of being connected to a network 110. The network 110 may be any network for transmitting and receiving data to and from the subsystems. The network 110 may also facilitate communication of data collected from and shared with the subsystems with servers or other shared data systems. For example, the surface control unit 100 may share subsystem sensor measurement data, subsystem control actions, and subsystem state data with servers, computers, or devices over network 110. Network 110 may be a local area network (LAN), wide area network (WAN), a telephone network, such as the Public Switched Telephone Network (PTSN), an intranet, the Internet, or combinations thereof. In at least one aspect of the present disclosure, the network may be a telemetry network, such as one or more of a mud pulse telemetry network, an electromagnetic telemetry network, a wired pipe network, a pipe-in-pipe network, an acoustic telemetry network, a torsion telemetry network, or combinations thereof. In some cases, the network can be a combination of traditional or telemetry networks.

Although FIG. 1 depicts a vertical wellbore 136, the present disclosure is equally well-suited for use in wellbores having other orientations including horizontal wellbores, slanted wellbores, multilateral wellbores or the like. Also, even though FIG. 1 depicts an onshore operation, the present disclosure is equally well-suited for use in offshore operations.

Although shown and described with respect to a rotary drill system in FIG. 1, many types of drills can be employed in carrying out embodiments of the invention, such as, for example, Auger drills, air core drills, cable tool drills, diamond core drills, percussion rotary air blast (RAB) drills, reverse circulation drills, and the like.

While FIG. 1 depicts an onshore drilling rig, the present disclosure is equally well-suited to use in offshore drilling operations. Offshore oil rigs that can be used in accordance with the present disclosure include, for example, floaters, fixed platforms, gravity-based structures, drillships, semi-submersible platform, jack-up drilling rigs, tension-leg platforms, and the like. The present disclosure is suited for use in rigs ranging anywhere from small in size and portable, to bulky and permanent.

The present disclosure is suited for use in any drilling operation that generates a subterranean borehole. For example, the present disclosure is suited to drilling for hydrocarbon or mineral exploration, environmental investigations, natural gas extraction, underground installation, mining operations, water wells, geothermal wells, and the like.

Figure 4:
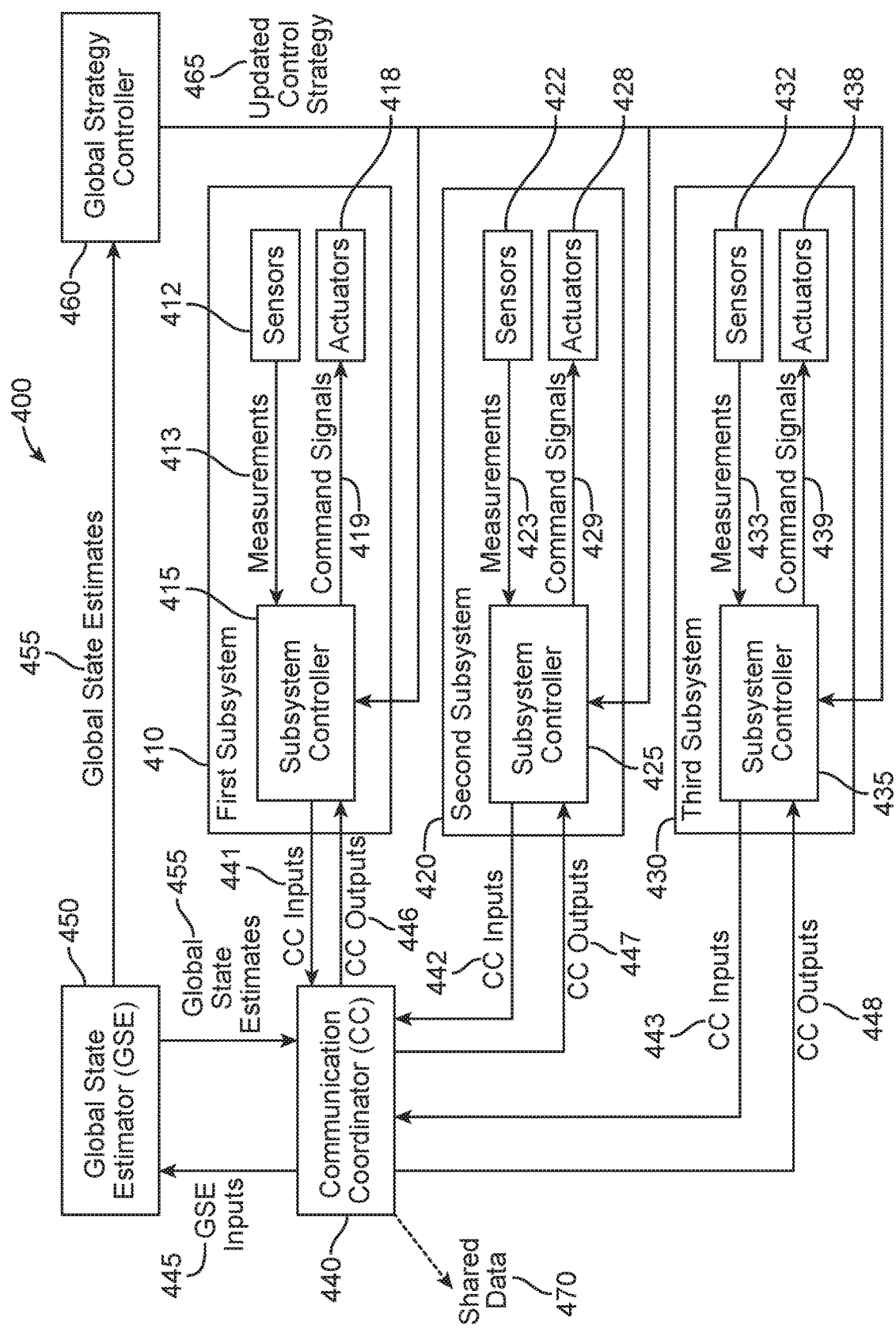
FIG. 4 is an illustration depicting a drilling control system including a plurality of subsystems, according to an exemplary embodiment.

FIG. 4 illustrates a drilling control system 400 for coordinating the control of a plurality of drilling subsystems, according to at least one aspect of the present disclosure. As depicted in FIG. 4, the drilling system 400 includes a first subsystem 410, a second subsystem 420, and a third subsystem 430. Each subsystem includes a subsystem controller 415, 425, 435, one or more sensors 412, 422, 432, and one or more actuators 418, 428, 438. Each subsystem controller 415, 425, 435 is communicatively coupled with the one or more sensors 412, 422, 432 and the one or more actuators 418, 428, 438.

Sensors 412, 422, 432 are configured to measure one or more subsystem state parameters and send the subsystem state parameter measurements 413, 423, 433 to the subsystem controllers 415, 425, 435. Actuators 418, 428, 438 are configured to adjust or control one or more drilling subsystem control variables upon receiving a command signal from a subsystem controller 415, 425, 435.

The subsystem controllers 415, 425, 435 are configured to receive measurement data from the sensors 412, 422, 432. The subsystem controllers 415, 425, 435 are further configured to determine a local subsystem state based at least in part on measurements received from the one or more sensors 412, 422, 432. Each subsystem controller is further configured to send command signals 419, 429, 439 to the one or more actuators 418, 428, 438 based at least in part on the local subsystem state and a control strategy necessary to achieve a performance objective of the drilling subsystem 410, 420, 430 or drilling system 400. In some cases, the subsystem controllers 415, 425, 435 may send command signals to a lower level controller (not shown) capable of causing actuation of the actuators 418, 428, 438 to adjust or modify a drilling control variable in accordance with the command signal sent by the subsystem controller 415, 425, 435. The lower level controllers may be relatively simple controllers such as a proportional-integral-derivative (PID) type controller and/or a control loop feedback mechanism controller.

The subsystem controllers 415, 425, 435, may include one or more processors configured to practice the concepts, methods, and techniques disclosed herein. The subsystem controllers 415, 425, 435 may be any suitable computer, controller, or data processing apparatus capable of being programmed to carry out the method and apparatus as described herein. Each subsystem controller 415, 425, 435, may include, for example, the system bus computing system architecture 300 illustrated in FIG. 3A or the computer system 350 depicted in FIG. 3B.

Because the control actions taken by any of the subsystem controllers 415, 425, 435 of the individual drilling subsystems 410, 420, 430 can have interaction effects affecting the performance of the other drilling subsystems 410, 420, 430, the present disclosure provides apparatus, systems, and methods for coordinating the control actions of individual subsystems based at least in part on a global view of the performance of each individual subsystem. According to at least one aspect of the present disclosure, a global view of drilling subsystem performance may be achieved and coordinated by a communication coordinator (CC) 440, global state estimator (GSE) 450, and a global strategy controller 460.

As depicted in FIG. 4, the drilling system 400 further includes a communication coordinator (CC) 440 communicatively coupled with each of the subsystem controllers 415, 425, 435 of drilling subsystems 410, 420, 430. The communication coordinator (CC) 440 captures the communication matrix among the plurality of subsystem controllers 415, 425, 435 and updates each of the subsystem controllers 415, 425, 435 with the most up-to-date data representing the state and performance of neighboring subsystems. The communication coordinator (CC) 440 is configured to receive CC input data 441, 442, 443 from each of the subsystem controllers 415, 425, 435. The CC input data 441, 442, 443 includes the local subsystem state determined by each of the plurality of subsystem controllers 415, 425, 435. According to at least one aspect of the present disclosure, the CC input data 441, 442, 443 may also include command action data that includes the command signals sent by each of the subsystem controllers 415, 425, 435 to the one or more actuators 418, 428, 438.

According to at least one aspect of the present disclosure, the communication coordinator (CC) 440 is communicatively coupled with a global state estimator (GSE) 450. The communication coordinator (CC) 440 is configured to transmit GSE input data 445 to the global state estimator (GSE) 450. The GSE input data 445 includes the local subsystem state determined by each of the plurality of subsystem controllers 415, 425, 435, and the command action data that includes command signals sent by each of the subsystem controllers 415, 425, 435 to the one or more actuators 418, 428, 438.

The global state estimator (GSE) is configured to receive GSE input data 445 from the communication coordinator (CC) 440. The global state estimator (GSE) 450 is further configured to determine global state estimates 455 based at least in part on the local subsystem states and the command action data that includes command signals actually sent by the subsystem controllers 415, 425, 435. The global state estimates 455 includes a complete set of local state estimates for the plurality of subsystems 415, 425, 435. Because of communication limitations and the variety of sensor types used, local states and command actions may be transmitted asynchronously from the different subsystems through the communication coordinator (CC) 440 and to the global state estimator (GSE) 450. Therefore, the global state estimates 455 are an estimate of each of the local subsystem states that takes into account delays in communication between the various subsystems and subsystem components due to bandwidth limitations of the communication systems as well as the geographic spread of subsystem equipment. The global state estimates may also take into account inaccurate, delayed, or infrequent sensor measurement data.

The global state estimator (GSE) 450, may include one or more processors configured to practice the concepts, methods, and techniques disclosed herein. The global state estimator (GSE) 450 may be any suitable computer, controller, or data processing apparatus capable of being programmed to carry out the method and apparatus as described herein. The global state estimator (GSE) 450, may include, for example, the system bus computing system architecture 300 illustrated in FIG. 3A or the computer system 350 depicted in FIG. 3B.

As depicted in FIG. 4, the global state estimator (GSE) 450 is communicatively coupled with global strategy controller 460. The global state estimator (GSE) 450 is configured to transmit global state estimates 455 to the global strategy controller 460. The global state estimator (GSE) 450 is also configured to transmit global state estimates 455 to the communication coordinator (CC) 440.

The communication coordinator (CC) 440 is configured to transmit CC output data 446, 447, 448 to each of the subsystem controllers 415, 425, 435. The CC output data 446, 447, 448 includes the global state estimates 455. In some cases, the CC output data 446, 447, 448 may also include the local subsystem states and the command action data that includes command signals actually sent by the subsystem controllers 415, 425, 435. In some cases, the communication coordinator (CC) 440 may be further configured to share data 470, such as the CC input data 441, 442, 443, or the CC output data 446, 447, 448 with other computers, servers, databases, or systems. The shared data 470 may be transmitted over a network, such as network 110 depicted in FIG. 1 and described above.

The communication coordinator (CC) 440, may include one or more processors configured to practice the concepts, methods, and techniques disclosed herein. The communication coordinator (CC) 440 may be any suitable computer, controller, or data processing apparatus capable of being programmed to carry out the method and apparatus as described herein. The communication coordinator (CC) 440, may include, for example, the system bus computing system architecture 300 illustrated in FIG. 3A or the computer system 350 depicted in FIG. 3B.

As depicted in FIG. 4, the global strategy controller 460 is communicatively coupled with the global state estimator (GSE) 450 and each of the plurality of subsystem controllers 415, 425, 435. The global strategy controller 460 is configured to receive the global state estimates 455 from the global state estimator (GSE) 450 and determine an updated control strategy 465 based at least in part on the global state estimates 455 and a performance objective of the drilling system 400. The global strategy controller 460 evaluates the global state estimates 455 and redistributes the priority of each subsystem's control strategy, in the form of an updated control strategy 465, in order to achieve the performance objectives of the drilling system 400. The global strategy controller 460 is further configured to transmit the updated control strategy 465 to each of the plurality of subsystem controllers 415, 425, 435.

The updated control strategy 465 determined by the global strategy controller 460 may take one of several forms. In some cases, the updated control strategy 465 may be in the form of an updated objective function. The updated objective function may include a reweighting of different penalty terms to reprioritize different objectives within the overall drilling system 400. For example, the performance objectives of the drilling system 400 may be to (1) maximize the rate of penetration (ROP), (2) minimize nonproductive time, (3) drill a path without exiting the desired lithographic layer, and (4) maintain all subsystems within safe operating parameters. These drilling system performance objectives may be described mathematically as a series of penalty functions and constraints within the framework of an optimization problem. For example, within a minimization problem, the ROP could be given a negative penalty coefficient within the objective function to indicate that higher ROP is desired. Another term can be added to the objective function to penalize deviation from the desired mud equivalent circulating density (ECD). ECD control is important because too high of an ECD can lead to drilling fluid sage and stuck pipe. At the beginning of drilling operations the objective function considered by the subsystem controllers could include a relatively low penalty for deviation from a target ECD as compared to the reward for achieving a higher ROP. However, if later in the drilling operation, the global strategy controller determines based upon global state estimates that the current objective function may lead to a stuck pipe contrary to the performance objective of the drilling system, the global strategy controller can update the objective function to prioritize reaching the target value of ECD even if this could lead to a reduced ROP. In this way, updating of the control strategy in the form of an updated objective function achieves the performance objectives of the drilling system 400. In cases where the updated control strategy 465 is in the form of an updated objective function, each subsystem controller 415, 425, 435 may be of a model predictive control type.

In other cases, the updated control strategy 465 may include an adjustment to the local control law of each subsystem controller 415, 425, 435. Local control law is a function of local system states that determines the control action at any time step, such as Proportional-Integral-Derivative (PID) control law. In still other cases, the updated control strategy 465 may include updated controller settings calculated to obtain the performance objectives of the drilling system 400. Controller setting changes may include the changes of the controller design such as the adjustments on the feedback states.

Once each subsystem controller 415, 425, 435 has received an updated control strategy 465 from the global strategy controller 460, each subsystem controller 415, 425, 435 may send command signals 419, 429, 439 to one or more actuators 418, 428, 438 based at least in part on the local subsystem state and the updated control strategy 465 determined by the global strategy controller 460 to substantially obtain a performance objective of the drilling system 400.

According to at least one aspect of the present disclosure, each subsystem controller 415, 425, 435, may send command signals 419, 429, 439 to one or more actuators 418, 428, 438 based at least in part on the global state estimates 455 (in the form of CC outputs 446, 447, 448), the local subsystem state, control actions of each of the subsystem controllers including command signals sent to one or more actuators 418, 428, 438 (in the form of CC outputs 446, 447, 448), and the updated control strategy 465.

The global strategy controller 460 may include one or more processors configured to practice the concepts, methods, and techniques disclosed herein. The global strategy controller 460 may be any suitable computer, controller, or data processing apparatus capable of being programmed to carry out the method and apparatus as described herein. The global strategy controller 460 may include, for example, the system bus computing system architecture 300 illustrated in FIG. 3A or the computer system 350 depicted in FIG. 3B.

In some cases, the global state estimator (GSE) 450 may be incorporated into either the communication coordinator (CC) 440 or the global strategy controller (460). In other cases, either the communication coordinator (CC) 440 or the global strategy controller 460 may include modules that perform the functions of the global state estimator (GSE) 450.

In some cases, the global strategy controller 460 transmits the updated control strategy 465 to the plurality of subsystem controllers 415, 425, 435 via the communication coordinator (CC) 440, rather than by direct communication between the global strategy controller 460 and each subsystem controller 415, 425, 435.

While FIG. 4 depicts three subsystems, the drilling system 400 may include any number of subsystems so long as there are a plurality of subsystems. Additionally, each of the subsystems illustrated in FIG. 4 may be further divided into additional subsystems or may themselves be included in other subsystems without departing from the scope and spirit of the present disclosure.

Figure 5:
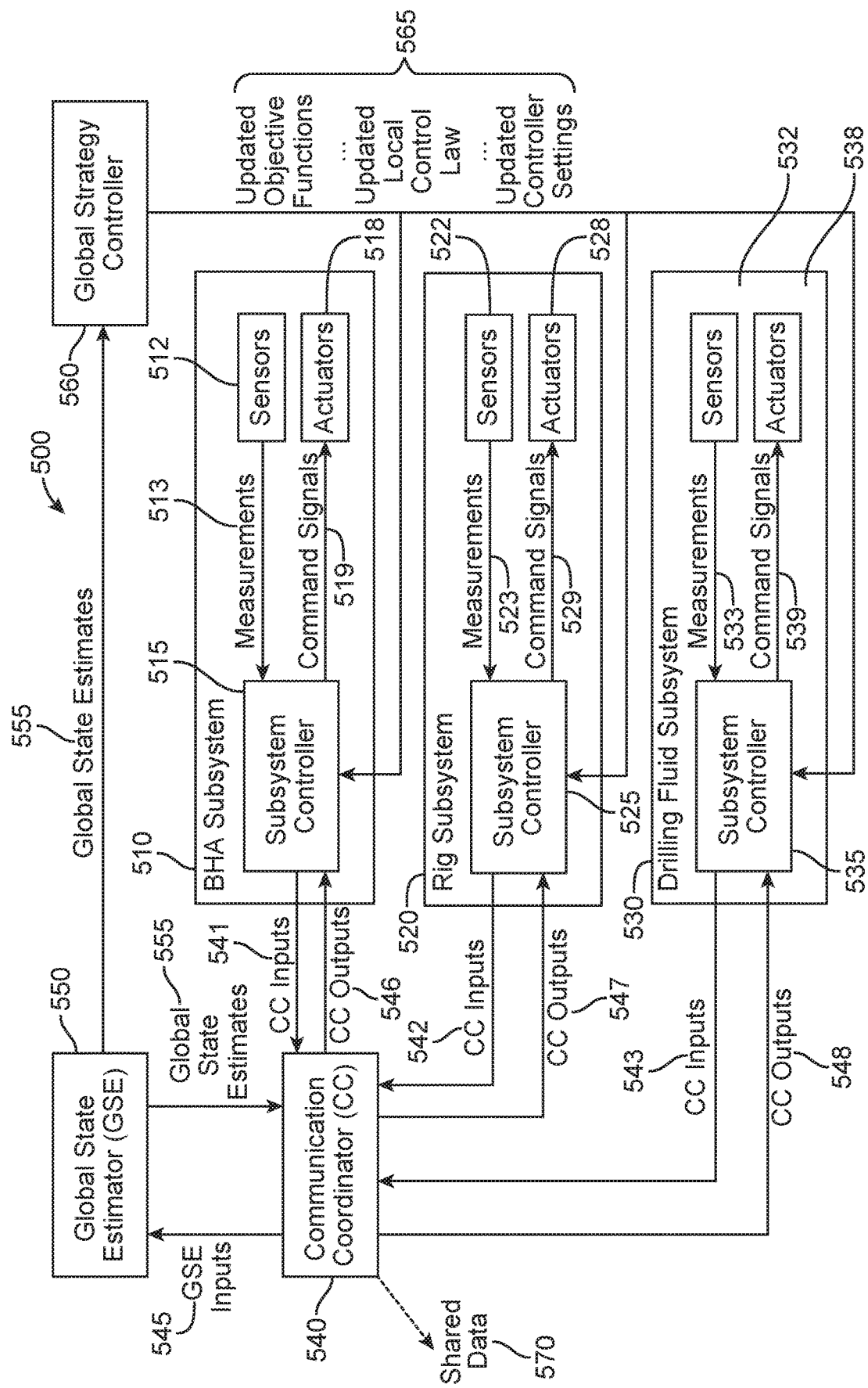
FIG. 5 is an illustration depicting a drilling control system including a rig subsystem, a drilling fluid subsystem, and a BHA subsystem, according to an exemplary embodiment.

FIG. 5 illustrates a drilling control system 500 for coordinating the control of a plurality of drilling subsystems that includes BHA subsystem 510, rig subsystem 520, and drilling fluid subsystem 530, according to at least one aspect of the present disclosure. As depicted in FIG. 5, the BHA subsystem 510 includes BHA subsystem controller 515, one or more BHA subsystem sensors 512, and one or more BHA subsystem actuators 518. The BHA subsystem controller 515 is communicatively coupled with the one or more BHA subsystem sensors 512 and the one or more BHA subsystem actuators 518.

The BHA subsystem sensors 512 are configured to measure one or more BHA subsystem state parameters and send the subsystem state parameter measurements 513 to the BHA subsystem controller 515. For example, the BHA subsystem sensors 512 can be configured to measure a BHA subsystem state parameter including, but not limited to, formation resistivity near the drill bit, formation gamma ray intensity, formation porosity, formation lithology, inclination of the drill string, azimuth of the drill string, downhole fluid pressure, shock, vibration, torque, revolutions per minute (RPM) of the fluid-driven motor, changes in torque or power of the fluid-driven motor, and drill string or drill bit telemetry. The BHA subsystem sensors 512 may include, but are not limited to, sensors selected from the group consisting of acoustic logging tools, neutron logging tools, gamma ray logging tools, density logging tools, photoelectron logging tools, and nuclear magnetic resonance (NMR) logging tools.

BHA subsystem actuators 518 are configured to adjust or control one or more BHA subsystem drilling control variables upon receiving a command signal from the BHA subsystem controller 515. For example, the BHA subsystem actuators 518 can be configured to adjust or control one or more BHA subsystem drilling control variables including, but not limited to, well path, drill bit orientation, path or steering, and drill string orientation, path or steering.

The BHA subsystem controller 515 is configured to receive measurement data from the BHA subsystem sensor 512. The BHA subsystem controller 515 is further configured to determine a local BHA subsystem state based at least in part on measurements received from the one or more BHA subsystem sensors 512. The BHA subsystem controller 515 is further configured to send command signals 519 to the one or more BHA subsystem actuators 518 based at least in part on the local BHA subsystem state and a control strategy necessary to achieve a performance objective of the BHA subsystem 510 or drilling system 500.

The BHA subsystem controller 515 may be configured to transmit measurements 513 obtained from the one or more sensors 512 to a surface control unit, for example, the surface control unit 100 depicted in FIG. 1. Communication systems for transmitting measurements 513 to the surface may include, but are not limited to, mud pulse telemetry, wired communication, fiber optic communication, and wireless communication system.

As depicted in FIG. 5, the rig subsystem 520 includes rig subsystem controller 525, one or more rig subsystem sensors 522, and one or more rig subsystem actuators 528. The rig subsystem controller 525 is communicatively coupled with the one or more rig subsystem sensors 522 and one or more rig subsystem actuators 528.

The rig subsystem sensors 522 are configured to measure one or more rig subsystem state parameter and send the subsystem state parameter measurements 523 to the rig subsystem controller 525. For example, the rig subsystem sensors 522 can be configured to measure a rig subsystem state parameter including, but not limited to revolutions per minute (RPM), weight-on-bit (WOB), torque-on-bit (TOB), rate of penetration (ROP), well depth, hook load, and standpipe pressure.

Rig subsystem actuators 528 are configured to adjust or control one or more rig subsystem drilling control variables upon receiving a command signal from the rig subsystem controller 525. For example, the rig subsystem actuators 528 can be configured to adjust or control one or more rig subsystem drilling control variables including, but not limited to, revolutions per minute (RPM), weight-on-bit (WOB), torque-on-bit (TOB), rate of penetration (ROP), and hook load.

The rig subsystem controller 525 is configured to receive measurement data from the rig subsystem sensor 522. The rig subsystem controller 525 is further configured to determine a local rig subsystem state based at least in part on measurements received from the one or more rig subsystem sensors 522. The rig subsystem controller 525 is further configured to send command signals 529 to the one or more rig subsystem actuators 528 based at least in part on the local rig subsystem state and a control strategy necessary to achieve a performance objective of the rig subsystem 520 or drilling system 500.

As depicted in FIG. 5, the drilling fluid subsystem 530 includes drilling fluid subsystem controller 535, one or more drilling fluid subsystem sensors 532, and one or more drilling fluid subsystem actuators 538. The drilling fluid subsystem controller 535 is communicatively coupled with the one or more drilling fluid subsystem sensors 532 and one or more drilling fluid subsystem actuators 538.

The drilling fluid subsystem sensors 532 are configured to measure one or more drilling fluid subsystem state parameters and send the subsystem state parameter measurements 533 to the drilling fluid subsystem controller 535. For example, the drilling fluid subsystem sensors 532 can be configured to measure a drilling fluid subsystem state parameter including, but not limited to drilling fluid flow rate or drilling fluid pump rate, volume of cuttings removed by cutting removal equipment, lithology of cuttings removed by cutting removal equipment, quantity of cuttings removed by cutting removal equipment, weight of cuttings removed by cutting removal equipment, density of cuttings removed by cutting removal equipment, shape or morphology of cuttings removed by cutting removal equipment, visual characteristics of cuttings removed by cutting removal equipment, particle size distribution (PSD) of cuttings removed by cutting removal equipment, weight or volume of fines removed by mud conditioning equipment, particle size distribution (PSD) of fines removed by mud conditioning equipment, drilling fluid rheology, drilling fluid density, mud equivalent circulating density (ECD), electrical stability of the drilling fluid, percent solids in the drilling fluid, oil/water ratio in the drilling fluid, drilling fluid pH, drilling fluid salinity, and particle size distribution (PSD) of the drilling fluid.

Drilling fluid subsystem actuators 538 are configured to adjust or control one or more drilling fluid subsystem drilling control variables upon receiving a command signal from the drilling fluid subsystem controller 535. For example, the drilling fluid subsystem actuators 538 can be configured to adjust or control one or more drilling fluid subsystem drilling control variables including, but not limited to, drilling fluid pumping rate or drilling fluid flow rate, shaker screen desk angle, shaker vibration, shake G-force, cuttings conveyance velocity, drilling fluid composition, drilling fluid additive supply valves, drilling fluid additive feed rate, and drilling fluid discharge rates.

The drilling fluid subsystem controller 535 is configured to receive measurement data from the drilling fluid subsystem sensor 532. The drilling fluid subsystem controller 535 is further configured to determine a local drilling fluid subsystem state based at least in part on measurements received from the one or more drilling fluid subsystem sensors 532. The drilling fluid subsystem controller 535 is further configured to send command signals 539 to the one or more drilling fluid subsystem actuators 538 based at least in part on the local drilling fluid subsystem state and a control strategy necessary to achieve a performance objective of the drilling fluid subsystem 530 or drilling system 500.

The subsystem controllers 515, 525, 535, may include one or more processors configured to practice the concepts, methods, and techniques disclosed herein. The subsystem controllers 515, 525, 535 may be any suitable computer, controller, or data processing apparatus capable of being programmed to carry out the method and apparatus as described herein. Each subsystem controller 515, 525, 535, may include, for example, the system bus computing system architecture 300 illustrated in FIG. 3A or the computer system 350 depicted in FIG. 3B.

As depicted in FIG. 5, the drilling system 500 further includes a communication coordinator (CC) 540 communicatively coupled with each of the subsystem controllers 515, 525, 535 of drilling subsystems 510, 520, 530. The communication coordinator (CC) 540 is configured to receive CC input data 541, 542, 543 from each of the subsystem controllers 515, 525, 535. The CC input data 541, 542, 543 includes the local subsystem state determined by each of the plurality of subsystem controllers 515, 525, 535. According to at least one aspect of the present disclosure, the CC input data 541, 542, 543 may also include command action data that includes the command signals sent by each of the subsystem controllers 515, 525, 535 to the one or more actuators 518, 528, 538.

According to at least one aspect of the present disclosure, the communication coordinator (CC) 540 is communicatively coupled with a global state estimator (GSE) 550. The communication coordinator (CC) 540 is configured to transmit GSE input data 545 to the global state estimator (GSE) 550. The GSE input data 545 includes the local subsystem state determined by each of the plurality of subsystem controllers 515, 525, 535, and the command action data that includes command signals sent by each of the subsystem controllers 515, 525, 535 to the one or more actuators 518, 528, 538.

The global state estimator (GSE) is configured to receive GSE input data 545 from the communication coordinator (CC) 540. The global state estimator (GSE) 550 is further configured to determine global state estimates 555 at least in part on the local subsystem states and the command action data that includes command signals actually sent by the subsystem controllers 515, 525, 535. The global state estimates 555 are an estimate of the global subsystem states that take into account delays in communication between the various subsystems and subsystem components due to bandwidth limitations of the communication systems as well as the geographic spread of subsystem equipment. The global state estimates may also take into account inaccurate, delayed, or infrequent sensor measurement data.

The global state estimator (GSE) 550, may include one or more processors configured to practice the concepts, methods, and techniques disclosed herein. The global state estimator (GSE) 550 may be any suitable computer, controller, or data processing apparatus capable of being programmed to carry out the method and apparatus as described herein. The global state estimator (GSE) 550, may include, for example, the system bus computing system architecture 300 illustrated in FIG. 3A or the computer system 350 depicted in FIG. 3B.

As depicted in FIG. 5, the global state estimator (GSE) 550 is communicatively coupled with global strategy controller 560. The global state estimator (GSE) 550 is configured to transmit global state estimates 455 to the global strategy controller 560. The global state estimator (GSE) 550 is also configured to transmit global state estimates 555 to the communication coordinator (CC) 540.

The communication coordinator (CC) 540 is configured to transmit CC output data 546, 547, 548 to each of the subsystem controllers 515, 525, 535. The CC output data 546, 547, 548 includes the global state estimates 555. In some cases, the CC output data 546, 547, 548 may also include the local subsystem states and the command action data that includes command signals actually sent by the subsystem controllers 515, 525, 535. In some cases, the communication coordinator (CC) 540 may be further configured to share data 570, such as the CC input data 541, 542, 543, or the CC output data 546, 547, 548 with other computers, servers, databases, or systems. The shared data 570 may be transmitted over a network, such as network 110 depicted in FIG. 1 and described above.

The communication coordinator (CC) 540, may include one or more processors configured to practice the concepts, methods, and techniques disclosed herein. The communication coordinator (CC) 540 may be any suitable computer, controller, or data processing apparatus capable of being programmed to carry out the method and apparatus as described herein. The communication coordinator (CC) 540, may include, for example, the system bus computing system architecture 300 illustrated in FIG. 3A or the computer system 350 depicted in FIG. 3B.

As depicted in FIG. 5, the global strategy controller 560 is communicatively coupled with the global state estimator (GSE) 550 and each of the plurality of subsystem controllers 515, 525, 535. The global strategy controller 560 is configured to receive the global state estimates 555 from the global state estimator (GSE) 550 and determined an updated control strategy 565 based at least in part on the global state estimates 555 and the performance objective of the drilling system 500. The updated control strategy 565 may take the form of either an updated objective function, updated local control law, or updated controller setting, as described above with respect to FIG. 4. The global strategy controller 560 is further configured to transmit the updated control strategy 565 to each of the plurality of subsystem controllers 515, 525, 535.

Once each subsystem controller 515, 525, 535 has received an updated control strategy 565 from the global strategy controller 560, each subsystem controller 515, 525, 535 may send command signals 519, 529, 539 to one or more actuators 518, 528, 538 based at least in part on the local subsystem state and the updated control strategy 565 determined by the global strategy controller 560 to substantially obtain a performance objective of the drilling system 500.

According to at least one aspect of the present disclosure, each subsystem controller 515, 525, 535, may send command signals 519, 529, 539 to one or more actuators 518, 528, 538 based at least in part on two or more of the global state estimates 555 (in the form of CC outputs 546, 547, 548), the local subsystem state, control actions of each of the subsystem controllers including command signals sent to one or more actuators 518, 528, 538 (in the form of CC outputs 546, 547, 548), and the updated control strategy 565.

The global strategy controller 560 may include one or more processors configured to practice the concepts, methods, and techniques disclosed herein. The global strategy controller 560 may be any suitable computer, controller, or data processing apparatus capable of being programmed to carry out the method and apparatus as described herein. The global strategy controller 560 may include, for example, the system bus computing system architecture 300 illustrated in FIG. 3A or the computer system 350 depicted in FIG. 3B.

In some cases, the global state estimator (GSE) 550 may be incorporated into either the communication coordinator (CC) 540 or the global strategy controller (560). In other cases, either the communication coordinator (CC) 540 or the global strategy controller 560 are capable of performing the previously described functions of the global state estimator (GSE) 550.

According to at least one aspect of the present disclosure, a method for coordinating the control of a plurality of subsystems based on concepts from game theory is provided. FIGS. 4 and 5 illustrate a drilling system having a distributed control architecture in which the plurality of drilling subsystems behave as independent decision making agents or players. However, in at least some cases, obtaining the performance objective of the drilling system may require avoidance of detrimental competition effects among the plurality of the drilling subsystems. In order to avoid detrimental competition effects among the drilling subsystems the drilling system depicted in FIGS. 4 and 5 also includes hierarchical architectural elements in the form of a global strategy controller capable of updating the control strategy for each drilling subsystem. Game theory provides tools useful for analyzing and performing strategic decision-making of multiple agents, wherein decision-making situations are described as mathematical objects referred to as "games." In the game theory based control framework, the entire drilling system is decomposed into a plurality of distributed subsystems. For example, the drilling subsystem may be decomposed into a rig subsystem, a drilling fluid subsystem, and a BHA subsystem. Each of these subsystems is treated as a "player" in the game theory based control framework. Each subsystem/player has its own control action set, local constraints, and local control strategy (for example, objective function) that he wants to maximize or minimize. For example, the drilling fluid subsystem's objective may be to control the drilling fluid properties and efficiently remove formation cuttings from the drilling fluid. The goal of the BHA subsystem may be to direct the well path to extend into the payzone formation in order to maximize production potential. The rig subsystem's objective may be to provide a hook load and top drive sufficient to produce the correct WOB to the BHA subsystem in order to maximize ROP. The overall drilling performance depends on the cooperative behavior of the individual subsystems/players. Each subsystem/player's decision-making involves a certain degree of partial information about other subsystems/players and the drilling system as a whole.

For example, if the measured ROP is different than the ROP required by the current control strategy, then an updated control strategy may include an objective function that penalizes control actions by the rig subsystem that are expected to decrease BHA subsystem performance. Additionally, the updated objective function may include hook load/top drive performance parameters that are expected to increase BHA subsystem performance. One of the possible updated objective functions may include a weighted penalty term on the rig subsystem's objective function according to the following expression:

$$J_{Rig} = \min_{u_{rig} \in U_{rig}} [(ROP - ROP^*) + \alpha ROP_{Rig \leftarrow BHA}]. \quad (1)$$

where the term (ROP−ROP*) represents the deviations of the ROP produced by the rig subsystem from the target and the term $\alpha ROP_{Rig \leftarrow BHA}$ is the price to be paid for the rig system's influence on the BHA system's output.

When making command decisions, the subsystem/player i may select its action $u_i(t)$ based on its game playing strategy which is in turn based on the subsystem/player's historical playing experience and its observations over stages $\{0, 1, 2, \ldots, t-1\}$ of other players and the system as a whole. The interactions between the subsystems/co-players can be taken into account inside the subsystem's dynamical model according to the following:

$$\begin{cases} x_i = A_i x_i + B_i u_i \\ u_i = u_i^l + u_i^g \\ Y_i = C_i x_i \end{cases} \quad (2)$$

where $u_i$ are decomposed into the local purpose actions $u_i^l$ and global purpose actions $u_i^g$. The local purpose actions can be decided using the subsystem's own outputs and the global purpose actions can be decided using information from neighboring systems.

The purpose of the game theoretic control architecture for coordinating the control of a plurality of drilling subsystems is to maximize the performance objectives of the overall drilling system. For example, the performance objective of the drilling system may be to maximize rate of penetration (ROP) while maintaining all subsystems within safe operating parameters. Because the actions of one subsystem influences the system dynamics of the other subsystems, collaborative control over the drilling subsystems requires each subsystem to have access to the measurements and command decisions of other subsystems while each player subsystem makes command decisions. According to at least one aspect of the present disclosure, the measurements, command decisions, and interactions of the subsystems can be captured using a sensing communication matrix or interaction matrix. A sensing communication matrix may represent the information flow among the plurality of subsystems while taking into account the time delay inherent to the communication system and geographic spread between subsystems.

For example, in the case of a large time delay in the mud telemetry communication system, the drilling fluid dynamic properties will not be transmitted to the BHA system without substantial delay. The sensing communication matrix can be updated instantly so that the BHA subsystem can be aware of the delay and use proper state estimation techniques to predict the missing transmitted information from either historical data or a physical model. The sensing communication matrix is a time-varying and piecewise constant matrix whose dimension is equal to the total number of interacting states:

$$S(t) = \begin{bmatrix} S_{11}(t) & \cdots & S_{1N}(t) \\ \vdots & \ddots & \vdots \\ S_{N1}(t) & \cdots & S_{NN}(t) \end{bmatrix}, \quad (3)$$

where $S_{ij}$ stands for the vector states of subsystem j that has an effect on subsystem i. Similar interaction matrices can be constructed for the control actions of the plurality of subsystems in order to describe the shared dependence of these quantities between the different subsystems. These sensing communication matrices and interaction matrices can be determined locally and updated through the use of the communication coordinator (CC), for example the communication coordinator (CC) 440 in FIG. 4 or the communication coordinator (CC) 540 in FIG. 5. The communication coordinator (CC) can be configured to transmit the sensing communication matrices and/or the interaction matrices to subsystem controllers, for example, subsystem controllers 415, 425, 435 in FIG. 4 or subsystem controllers 515, 525, 535 in FIG. 5.

A general game theory based control model, G, may be include:

$$G = \{N, \{U_i\}_{i \in N}, \{V_i\}_{i \in N}, X_{i \in N}, f_{i \in N}\}, \quad (4)$$

where the set $N = \{1, 2, \ldots, n\}$ denotes the finite set of players (for example, n=3 for the three subsystems depicted in FIGS. 4 and 5); $u_i(t) \in U_i$, i=1, 2, . . . , n represents the actions of the $i^{th}$ player at time t, where $U_i$ is the set of actions from which the $i^{th}$ player can choose, which is a nonempty and convex set; $V_i$ is a state and action dependent payoff/value function, which represents the rewards that the players i receives at state $X_i(t)$ for making action $u_i(t)$. The compact system can be represented by the following state transition equation:

$$X = f(X, u_1, u_2, \ldots, u_n, t). \quad (5)$$

The system state X(t) and joint actions of all the subsystems together will determine each subsystem's local performance. Once the subsystems make the command decision, the state at next time step X(t+1) is determined according to the state transition function $$X(t+1) = f(X(t), U(t), w(t+1)), \quad (6)$$

where w stands for the system noise and $f$ is the state transition function which evolves as a function of the subsystem's actions series $u_i(t_0)$, $u_i(t_1)$, ... and the system noise.

At time step t, the subsystem receives some feedback X(t) about its own states and the states of other subsystems through the communication coordinator (CC). The function of the subsystem is to determine an optimal policy $\pi_i^*(X)$ that maximizes the total discounted rewards. The rewards could be defined as the improved value of its objective functions updated by the global strategy controller. The criteria of finding the best policy is to maximize the long term rewards which equals to the sum of the immediate rewards $r(X, u_i)$ by making this action, $u_i$, and the reward that the action brings to the future steps discounted by a factor, $\gamma$. At the next time step, the subsystem finds the environment at states set X' through the communication coordinator (CC) as a consequence of its and other subsystem's previous control actions, with state transition function $f_i(X, u_i, X')$. The optimal value function can be solved from the following set of Bellman equations using linear programming methods. From the equations, the optimal value function equals the expected immediate rewards, $r(X, u_i)$, plus the discounted rewards of the next state by taking the best action that can maximize the value function, defined as:

$$V_i^*(X) = \max_{u_i}\left(r(X, u_i) + \gamma \sum_{X' \in \overline{X}} f_i(X, u_i, X')V_i^*(X')\right), \forall X' \in \overline{X}. \quad (7)$$

From the optimal value function, the optimal policy may be found by performing the following optimization:

$$\pi_i^*(X) = \arg\max_{u_i}\left(r(X, u_i) + \gamma \sum_{X' \in \overline{X}} f_i(X, u_i, X')V_i^*(X')\right), \quad (8)$$

$$\forall X' \in \overline{X}, i = 1, \ldots, n.$$

Once the subsystems determine the optimal policies to achieve its assigned objective functions, the cooperative game solver controller obtains an optimal cooperative playing strategy, called a Pareto solution, formed by a set of player actions:

$$\{u_{1*}, u_{2*}, \ldots, u_{N*}\}, \quad (9)$$

in which, $J_g$, the selected global objective, is optimized according to:

$$J_g(u_{1*}, u_{2*}, \ldots, u_{N*}) = \max_{u_i \in U_i} J_g(u_i, \ldots, u_i, \ldots, u_n). \quad (10)$$

In the context of the drilling system 500 depicted in FIG. 5, which includes BHA subsystem 510, rig subsystem 520, and drilling fluid subsystem 530, each of the subsystem controllers 515, 525, 535 have their own control strategy 565 coordinated by the global strategy controller 560. For instance, the performance objective of the overall drilling system 500 may be to maintain a maximum rate of penetration (ROP) while minimizing sources of downtime such as that resulting from a stuck pipe due to fluid sag (settling of rock cutting downhole). The rig subsystem controller may have the following objective function:

$$\alpha_1 \text{ROP} + \beta_1 \text{Hole\_Cleaning}, \quad (11)$$

where ROP is a function describing the rate of penetration (ROP) and Hole_Cleaning is a function describing how effectively rock cuttings are being transported to the surface, and $\alpha_1$ and $\beta_1$ are positive coefficients assigning the relative importance of the two objectives. It may be assumed that the objective of the drilling fluid subsystem's controller is to minimize the function $(\text{ECD}-\text{ECD}^*)^2$, where ECD is the estimated bottom-hole equivalent circulating density (potentially inferred through sensor measurements of ECD of the surface-returned drilling fluid or determined local subsystem state from sensor measurements) and ECD* is the desired value of this quantity, and that the drilling system is operating at certain values of $\alpha_1$ and $\beta_1$. Measurements of the ROP obtained by the rig subsystem and inferred values of the ECD can be provided to the communication coordinator (CC) which, in turn, provides these values to the global state estimator (GSE). Assume further that the value of ECD is continuously above target during one time period of drilling and the GSE makes a prediction that there is a 40% likelihood of stuck pipe in the near future based on the estimated values of ROP and ECD where the ability of the drilling fluid subsystem to maintain the desired ECD is constrained by physical limits of the valves and pumps of the system. In this case, the global strategy controller can provide new objective function coefficients $\alpha_1$ and $\beta_1$ to replace coefficients $\alpha_1$ and $\beta_1$ within the rig subsystem controller, such that $\beta_2/\alpha_2 > \beta_1/\alpha_1$. This will reduce the probability of stuck pipe by increasing the value of Hole_Cleaning relative to the ROP.

Figure 6:
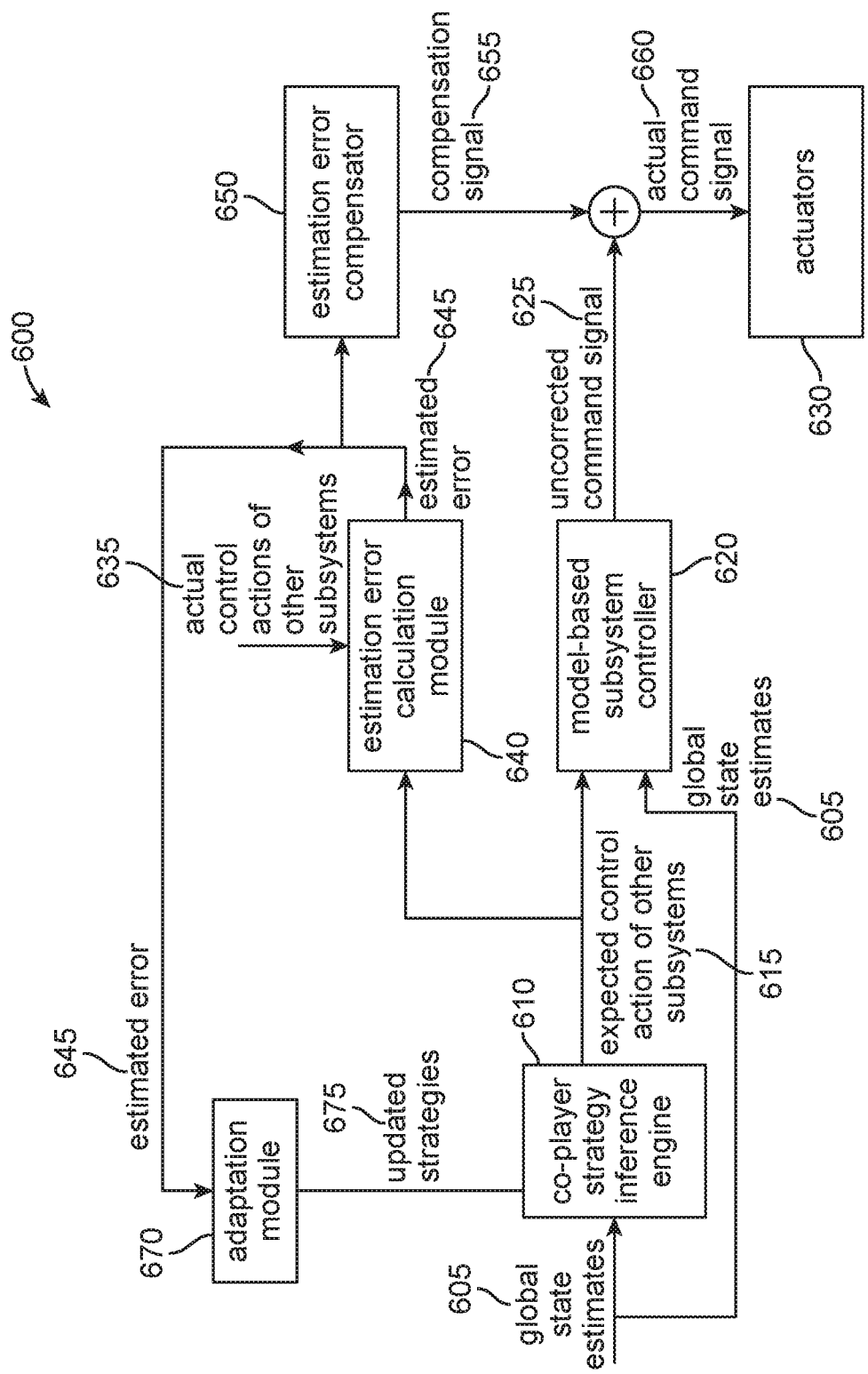
FIG. 6 is an illustration depicting a subsystem controller apparatus and method of controlling a subsystem, according to an exemplary embodiment.

According to at least one aspect of the present disclosure, each subsystem controller, such as subsystem controllers 415, 425, 435 in FIG. 4 or subsystem controllers 515, 525, 535 in FIG. 5, sends control action adjustments to one or more actuators based on a co-player inference playing strategy. FIG. 6 illustrates a subsystem controller apparatus and method of drilling subsystem controller decision-making based on a co-player inference playing strategy in which the subsystem controller makes decisions based upon the global state estimates of other subsystems as well as the expectations of the other subsystems control actions. In this method, each subsystem is considered a different "co-player" in the game theory context.

As depicted in FIG. 6, the subsystem controller comprises modules including a co-player strategy inference engine 610, model-based subsystem controller 620, estimation error calculation module 640, estimation error compensator 650, and adaptation module 670. The modules are communicatively coupled with each other and are configured to carry out the method 600 depicted in FIG. 6.

As depicted in FIG. 6, the method 600 includes receiving at a co-player strategy inference engine 610 global state estimates 605. The global state estimates 605 may be received at the co-player strategy inference engine 610, for example, from the communication controller (CC) 440 of FIG. 4 or the communication controller (CC) 540 of FIG. 5. The co-player strategy inference engine 610 predicts the control actions of the other subsystems based at least in part on the global state estimates 605 and provides the predictions of expected control actions of other subsystems 615 to a model-based subsystem controller 620. The model-based subsystem controller 620 makes command decisions based upon the predictions of expected control actions 615 and the global state estimates 605 in the form of uncorrected command signals 625 sent to local subsystem actuators 630.

However, because each local subsystem may be making decisions based upon different or erroneous information, the expected control actions of other subsystems 615 may contain errors. The method 600 includes two functions to correct for errors in the expected control actions of other subsystems 615. First, the estimated error 645 between the expected control action of other subsystems 615 and the actual command actions executed by each subsystem controller 635 is computed in estimation error calculation module 640. The actual command actions 635 may be received by the estimation error calculation module 640 from, for example, the communication coordinator (CC) 440 of FIG. 4 or the communication coordinator (CC) 540 of FIG. 5. The estimated error 645 can be transmitted to an estimation error compensator 650 capable of creating a compensation signal 655 to be added to the uncorrected command signal 625 to produce an actual command signal 660 to be sent to the subsystem actuator 630.

A second function to correct errors in the expected control actions of other subsystems 615 is included in method 600 in the form of adaption module 670. Adaption module 670 uses the estimated error 645, received from the estimation error calculation module 640, to update the strategies 675 used by the co-player strategy inference engine 610 to predict the expected control action of other subsystems 615. Accordingly, adaption module 670 serves to minimize future errors resulting from differences in expected control action of other subsystems 615 and the actual control actions of other subsystems 635.

According to the present disclosure, a drilling apparatus is provided. The drilling apparatus includes a plurality of subsystems in which each subsystem includes a subsystem controller, one or more sensors, and one or more actuators. Each subsystem controller is configured to determine a local subsystem state from measurements received from the one or more sensors and further configured to receive global state estimates based at least in part on the local subsystem states of each of the plurality of subsystems. Each subsystem controller is also configured to receive updated control strategies based at least in part on the global state estimates. The subsystem controllers are further configured to send command signals to the one or more actuators based on the local subsystem state, global state estimates, and the updated control strategy.

According to at least one aspect of the present disclosure, the subsystem controller included in the apparatus is further configured to receive data that includes command signals sent by each of the subsystem controllers to one or more actuators. Each subsystem controller is further configured to send command signals to one or more actuators based on the local subsystem state, global state estimates, updated control strategy, and command signals sent by each of the subsystem controllers.

According to at least one aspect of the present disclosure, the global state estimates include local state estimates for each of the plurality of subsystems.

According to at least one aspect of the present disclosure, the apparatus further includes a communication coordinator communicatively coupled with each of the plurality of subsystem controllers. The communication coordinator is configured to receive local subsystem states from each of the plurality of subsystem controllers and transmit global state estimates to each of the plurality of subsystem controllers. The communication coordinator may be further configured to receive data comprising command signals sent by each of the subsystem controllers to one or more subsystem actuators. The communication coordinator may be further configured to transmit data comprising command signals, sent by each of the subsystem controllers to one or more actuators, to each of the subsystem controllers. In some cases, the data transmitted by the communication coordinator includes at least one of either a sensing communication matrix or an interaction matrix.

According to at least one aspect of the present disclosure, the apparatus further includes a global state estimator communicatively coupled with the communication coordinator. The global state estimator is configured to determine global state estimates based at least in part on the local subsystem states of each of the plurality of subsystems and the command signals sent by each of the subsystem controllers to one or more subsystem actuators. The global state estimator is further configured to transmit the global state estimates to the communication coordinator for transmitting to each of the plurality of subsystem controllers.

According to at least one aspect of the present disclosure, the apparatus further includes a global strategy controller communicatively coupled with the global state estimator and each of the plurality of subsystem controllers. The global strategy controller is configured to receive and evaluate the global state estimates to determine updated control strategies required to achieve a performance objective of the apparatus. The global strategy controller is further configured to transmit the updated control strategies to the plurality of subsystem controllers. The updated control strategies may include either an updated objective function, an updated local control law, and an updated controller setting.

According to at least one aspect of the present disclosure, the plurality of subsystems included in the apparatus may include a drilling fluid subsystem, a bottom hole assembly (BHA) subsystem, and a rig subsystem. The components of the apparatus may be communicatively coupled using mud pulse telemetry.

According to at least one aspect of the present disclosure, the plurality of subsystems included in the apparatus may include a bottom hole assembly (BHA) subsystem. The bottom hole assembly (BHA) subsystem may include one or more sensors operable to measure a parameter selected from the group consisting of formation resistivity near the drill bit, formation gamma ray intensity, formation porosity, formation lithology, inclination of the drill string, azimuth of the drill string, downhole fluid pressure, shock, vibration, torque, revolutions per minute (RPM) of the fluid-driven motor, changes in torque or power of the fluid-driven motor, and drill string or drill bit telemetry. The bottom hole assembly (BHA) subsystem may include one or more actuators operable to control a parameter selected from the group consisting of well path, drill bit orientation, path or steering, and drill string orientation, path or steering. The bottom hole assembly (BHA) subsystem may include sensors selected form the group consisting of acoustic logging tools, neutron logging tools, gamma ray logging tools, density logging tools, photoelectron logging tools, and nuclear magnetic resonance (NMR) logging tools. The bottom hole assembly (BHA) subsystem may include a subsystem controller configured to transmit measurements obtained from the one or more sensors to a surface control unit. The subsystem controller included in the BHA subsystem may be configured to transmit measurements using one selected from the group consisting of mud pulse telemetry, wired communication, fiber optic communication, and wireless communication system.

According to at least one aspect of the present disclosure, the plurality of subsystems included in the apparatus includes a drilling fluid subsystem. The drilling fluid subsystem may include one or more sensors operable to measure a parameter selected from the group consisting of drilling fluid flow rate or drilling fluid pump rate, volume of cuttings removed by cutting removal equipment, lithology of cuttings removed by cutting removal equipment, quantity of cuttings removed by cutting removal equipment, weight of cuttings removed by cutting removal equipment, density of cuttings removed by cutting removal equipment, shape or morphology of cuttings removed by cutting removal equipment, visual characteristics of cuttings removed by cutting removal equipment, particle size distribution (PSD) of cuttings removed by cutting removal equipment, weight or volume of fines removed by mud conditioning equipment, particle size distribution (PSD) of fines removed by mud conditioning equipment, drilling fluid rheology, drilling fluid density, mud equivalent circulating density (ECD), electrical stability of the drilling fluid, percent solids in the drilling fluid, oil/water ratio in the drilling fluid, drilling fluid pH, drilling fluid salinity, and particle size distribution (PSD) of the drilling fluid. The drilling fluid subsystem may include one or more actuators operable to control a parameter selected from the group consisting of drilling fluid pumping rate or drilling fluid flow rate, shaker screen desk angle, shaker vibration, shake G-force, cuttings conveyance velocity, drilling fluid composition, mud equivalent circulating density (ECD), drilling fluid additive supply valves, drilling fluid additive feed rate, and drilling fluid discharge rates.

According to at least one aspect of the present disclosure, the plurality of subsystems included in the apparatus may include a rig subsystem. The rig subsystem may include one or more sensors operable to measure a parameter selected from the group consisting of revolutions per minute (RPM), weight-on-bit (WOB), torque-on-bit (TOB), rate of penetration (ROP), well depth, hook load, and standpipe pressure. The rig subsystem may include one or more actuators operable to control a parameter selected from the group consisting of revolutions per minute (RPM), weight-on-bit (WOB), torque-on-bit (TOB), rate of penetration (ROP), and hook load.

According to the present disclosure, a method of controlling a plurality of drilling subsystems is provided. The method includes providing a drilling system that includes a plurality of subsystems, with each subsystem including a controller communicatively coupled with one or more sensors and one or more actuators. The method further includes determining, at each subsystem controller, a local subsystem state from measurements received from the one or more sensors. The method additionally includes obtaining a global estimate based at least in part on the local subsystem states and command signals sent by each subsystem controller to the one or more actuators. The method further includes evaluating the global state estimates to determine updated local control strategies required to achieve the performance objective of the global system. The method additionally includes communicating the updated control strategies to each of the plurality of subsystem controllers and actuating, at each of the plurality of subsystems, one or more actuators to adjust a drilling subsystem control variable in response to the updated control strategies.

According to at least one aspect of the present disclosure, the updated control strategy includes and updated objective function. The method may use mud pulse telemetry as a communication system. The plurality of subsystems included in the method may include a BHA subsystem, a rig subsystem, and a drilling fluid subsystem.

According to the present disclosure, a drilling system is provided. The system includes a plurality of drilling subsystems, each drilling subsystem including a subsystem controller, one or more sensors, and one or more actuators. Each subsystem controller is configured to determine a local subsystem state from measurements received from the one or more sensors. The system further includes a communication coordinator communicatively coupled with each of the plurality of subsystem controllers and configured to receive local subsystem states from each of the plurality of subsystem controllers. The communication coordinator is further configured to receive, from each of the plurality of subsystem controllers, command signals sent by each subsystem controller to one or more actuators. The system further includes a global state estimator communicatively coupled with the communication coordinator and configured to determine global state estimates based at least in part on the local subsystem states and the command signals received from the communication coordinator. The global state estimator is further configured to transmit global estimates to the communication controller. The system further includes a global strategy controller communicatively coupled with the global state estimator and each of the plurality of subsystem controllers. The global strategy controller is configured to receive and evaluate the global state estimates to determine updated control strategies required to achieve the performance objective of the drilling system. The global strategy controller is further configured to communicate the updated control strategies to each of the plurality of subsystem controllers. Each subsystem controller in the system is configured to send command signals to the one or more actuators based at least in part on the local subsystem state, global state estimates received from the communication coordinator, and the updated control strategy.

According to at least one aspect of the present disclosure, the communication coordinator included in the system is further configured to transmit data, including command signals sent by each subsystem controller to each subsystem controller and global state estimates, to each of the plurality of subsystem controllers. Each subsystem controller is configured to send command signals to the one or more actuators based at least in part on the local subsystem state, the updated control figured to send command signals to one or more actuators based o According to at least one aspect of the present disclosure, the data transmitted by the communication coordinator to each of the plurality of subsystem controllers includes either at least one sensing communication matrix or at least one interaction matrix. The global state estimates may include local state estimates for each of the plurality of subsystems. The updated control strategies may include an updated objective function, an updated local control law, an updated controller setting, or any combination thereof. The plurality of drilling subsystems included in the system may include a drilling fluid subsystem, a bottom hole assembly (BHA) subsystem, and a rig subsystem. The communication between components of the system may occur by mud pulse telemetry.

According to at least one aspect of the present disclosure, the system includes a bottom hole assembly (BHA) subsystem. The bottom hole assembly (BHA) subsystem may include one or more sensors operable to measure a parameter selected from the group consisting of formation resistivity near the drill bit, formation gamma ray intensity, formation porosity, formation lithology, inclination of the drill string, azimuth of the drill string, downhole fluid pressure, shock, vibration, torque, revolutions per minute (RPM) of the fluid-driven motor, changes in torque or power of the fluid-driven motor, and drill string or drill bit telemetry. The bottom hole assembly (BHA) subsystem may also include one or more actuators operable to control a parameter selected from the group consisting of well path, drill bit orientation, path or steering, and drill string orientation, path or steering. The bottom hole assembly (BHA) subsystem may additionally include sensors selected form the group consisting of acoustic logging tools, neutron logging tools, gamma ray logging tools, density logging tools, photoelectron logging tools, and nuclear magnetic resonance (NMR) logging tools. The bottom hole assembly (BHA) subsystem may include a subsystem controller configured to transmit measurements obtained from the one or more sensors to a surface control unit. The subsystem controller may be further configured to transmit measurements using mud pulse telemetry, wired communication, fiber optic communication, wireless communication system, or any combination thereof.

According to at least one aspect of the present disclosure, the system includes a drilling fluid subsystem. The drilling fluid subsystem may include one or more sensors operable to measure a parameter selected from the group consisting of drilling fluid flow rate or drilling fluid pump rate, volume of cuttings removed by cutting removal equipment, lithology of cuttings removed by cutting removal equipment, quantity of cuttings removed by cutting removal equipment, weight of cuttings removed by cutting removal equipment, density of cuttings removed by cutting removal equipment, shape or morphology of cuttings removed by cutting removal equipment, visual characteristics of cuttings removed by cutting removal equipment, particle size distribution (PSD) of cuttings removed by cutting removal equipment, weight or volume of fines removed by mud conditioning equipment, particle size distribution (PSD) of fines removed by mud conditioning equipment, drilling fluid rheology, drilling fluid density, mud equivalent circulating density (ECD), electrical stability of the drilling fluid, percent solids in the drilling fluid, oil/water ratio in the drilling fluid, drilling fluid pH, drilling fluid salinity, and particle size distribution (PSD) of the drilling fluid. The drilling fluid subsystem may also include one or more actuators operable to control a parameter selected from the group consisting of drilling fluid pumping rate or drilling fluid flow rate, shaker screen desk angle, shaker vibration, shake G-force, cuttings conveyance velocity, drilling fluid composition, mud equivalent circulating density (ECD), drilling fluid additive supply valves, drilling fluid additive feed rate, and drilling fluid discharge rates.

According to at least one aspect of the present disclosure, the system may include a rig subsystem. The rig subsystem may include one or more sensors operable to measure a parameter selected from the group consisting of revolutions per minute (RPM), weight-on-bit (WOB), torque-on-bit (TOB), rate of penetration (ROP), well depth, hook load, and standpipe pressure. The rig subsystem may further include one or more actuators operable to control a parameter selected from the group consisting of revolutions per minute (RPM), weight-on-bit (WOB), torque-on-bit (TOB), rate of penetration (ROP), and hook load.

The presently disclosed apparatus, methods, and systems for coordinating the control of a plurality of drilling subsystems is suited, among other operating environments, for use in conjunction with mud pulse telemetry communication systems which are bandwidth limited and delayed. As such, the presently disclosed apparatus, methods, and systems may offer effective control over drilling systems even in the absence of reliance on wired pipe or other more expensive communication systems.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims. Moreover, claim language reciting "at least one of" a set indicates that a system including either one member of the set, or multiple members of the set, or all members of the set, satisfies the claim.

Statements of the Disclosure Include:

Statement 1: A drilling apparatus comprising: a plurality of subsystems, each subsystem comprising: a subsystem controller; one or more sensors; and one or more actuators; each subsystem controller configured to determine a local subsystem state from measurements received from the one or more sensors and further configured to receive global state estimates based at least in part on the local subsystem states of each of the plurality of subsystems; wherein each subsystem controller is configured to receive updated control strategies based at least in part on the global state estimates, each subsystem controller further configured to send command signals to one or more actuators based on the local subsystem state, global state estimates, and updated control strategy.

Statement 2: A drilling apparatus according to Statement 1, wherein each subsystem controller is further configured to receive data comprising command signals sent by each of the subsystem controllers to one or more actuators, and wherein each subsystem controller is further configured to send command signals to one or more actuators based on the local subsystem state, global state estimates, updated control strategy, and command signals sent by each of the subsystem controllers.

Statement 3: A drilling apparatus according Statement 1 or Statement 2, wherein the global state estimates comprises local state estimates for each of the plurality of subsystems.

Statement 4: A drilling apparatus according to any one of the preceding Statements 1-3, further comprising a communication coordinator communicatively coupled with each of the plurality of subsystem controllers, the communication coordinator configured to receive local subsystem states from each of the plurality of subsystem controllers and transmit global state estimates to each of the plurality of subsystem controllers.

Statement 5: A drilling apparatus according to Statement 4, wherein the communication coordinator is further configured to receive data comprising command signals sent by each of the subsystem controllers to one or more subsystem actuators.

Statement 6: A drilling apparatus according to Statement 4 or Statement 5, wherein the communication coordinator is further configured to transmit data comprising command signals, sent by each of the subsystem controllers to one or more actuators, to each of the subsystem controllers.

Statement 7: A drilling apparatus according to Statement 6, wherein the data transmitted by the communication coordinator comprises at least one selected from the group consisting of a sensing communication matrix and a interaction matrix.

Statement 8: A drilling apparatus according to any one of the preceding Statements 4-7, further comprising a global state estimator communicatively coupled with the communication coordinator, the global state estimator configured to determine global state estimates based at least in part on the local subsystem states of each of the plurality of subsystems and the command signals sent by each of the subsystem controllers to one or more actuators, the global state estimator further configured to transmit the global state estimates to the communication coordinator, the communication coordinator configured to transmit the global state estimates to each of the plurality of subsystem controllers.

Statement 9: A drilling apparatus according to Statement 8, further comprising a global strategy controller communicatively coupled with the global state estimator and each of the plurality of subsystem controllers, the global strategy controller configured to receive and evaluate the global state estimates to determine updated control strategies required to achieve a performance objective of the apparatus, the global strategy controller further configured to transmit said updated control strategies to the plurality of subsystem controllers.

Statement 10: A drilling apparatus according to any one of the preceding Statements 1-9, wherein the updated control strategies comprises one selected from the group consisting of an updated objective function, an updated local control law, and an updated controller setting.

Statement 11: A drilling apparatus according to any one of the preceding Statements 1-10, wherein the plurality of subsystems comprises a drilling fluid subsystem, a bottom hole assembly (BHA) subsystem, and a rig subsystem.

Statement 12: A drilling apparatus according to any one of the preceding Statements 4-11, wherein said communicatively coupled with comprises mud pulse telemetry.

Statement 13: A drilling apparatus according to any one of the preceding Statements 1-12, wherein the plurality of subsystems comprises a bottom hole assembly (BHA) subsystem.

Statement 14: A drilling apparatus according to Statement 13, wherein the bottom hole assembly (BHA) subsystem comprises one or more sensors operable to measure a parameter selected from the group consisting of formation resistivity near the drill bit, formation gamma ray intensity, formation porosity, formation lithology, inclination of the drill string, azimuth of the drill string, downhole fluid pressure, shock, vibration, torque, revolutions per minute (RPM) of the fluid-driven motor, changes in torque or power of the fluid-driven motor, and drill string or drill bit telemetry.

Statement 15: A drilling apparatus according to Statement 13 or Statement 14, wherein the bottom hole assembly (BHA) subsystem comprises one or more actuators operable to control a parameter selected from the group consisting of well path, drill bit orientation, path or steering, and drill string orientation, path or steering.

Statement 16: A drilling apparatus according to any one of the preceding Statements 13-15, wherein the bottom hole assembly (BHA) subsystem comprises sensors selected form the group consisting of acoustic logging tools, neutron logging tools, gamma ray logging tools, density logging tools, photoelectron logging tools, and nuclear magnetic resonance (NMR) logging tools.

Statement 17: A drilling apparatus according to any one of the preceding Statements 13-16, wherein the bottom hole assembly (BHA) subsystem comprises a subsystem controller configured to transmit measurements obtained from the one or more sensors to a surface control unit.

Statement 18: A drilling apparatus according to any one of the preceding Statements 13-17, wherein the subsystem controller is configured to transmit measurements using one selected from the group consisting of mud pulse telemetry, wired communication, fiber optic communication, and wireless communication system.

Statement 19: A drilling apparatus according to any one of the preceding Statements 1-18, wherein the plurality of subsystems comprises a drilling fluid subsystem.

Statement 20: A drilling apparatus according to Statement 19, wherein the drilling fluid subsystem comprises one or more sensors operable to measure a parameter selected from the group consisting of drilling fluid flow rate or drilling fluid pump rate, volume of cuttings removed by cutting removal equipment, lithology of cuttings removed by cutting removal equipment, quantity of cuttings removed by cutting removal equipment, weight of cuttings removed by cutting removal equipment, density of cuttings removed by cutting removal equipment, shape or morphology of cuttings removed by cutting removal equipment, visual characteristics of cuttings removed by cutting removal equipment, particle size distribution (PSD) of cuttings removed by cutting removal equipment, weight or volume of fines removed by mud conditioning equipment, particle size distribution (PSD) of fines removed by mud conditioning equipment, drilling fluid rheology, drilling fluid density, mud equivalent circulating density (ECD), electrical stability of the drilling fluid, percent solids in the drilling fluid, oil/water ratio in the drilling fluid, drilling fluid pH, drilling fluid salinity, and particle size distribution (PSD) of the drilling fluid.

Statement 21: A drilling apparatus according to Statement 19 or Statement 20, wherein the drilling fluid subsystem comprises one or more actuators operable to control a parameter selected from the group consisting of drilling fluid pumping rate or drilling fluid flow rate, shaker screen desk angle, shaker vibration, shake G-force, cuttings conveyance velocity, drilling fluid composition, mud equivalent circulating density (ECD), drilling fluid additive supply valves, drilling fluid additive feed rate, and drilling fluid discharge rates.

Statement 22: A drilling apparatus according to any one of the preceding statements 1-21, wherein the plurality of subsystems comprises a rig subsystem.

Statement 23: A drilling apparatus according to Statement 22, wherein the rig subsystem comprises one or more sensors operable to measure a parameter selected from the group consisting of revolutions per minute (RPM), weight-on-bit (WOB), torque-on-bit (TOB), rate of penetration (ROP), well depth, hook load, and standpipe pressure.

Statement 24: A drilling apparatus according to Statement 22 or Statement 23, wherein the rig subsystem comprises one or more actuators operable to control a parameter selected from the group consisting of revolutions per minute (RPM), weight-on-bit (WOB), torque-on-bit (TOB), rate of penetration (ROP), and hook load.

Statement 25: A drilling apparatus comprising: a global strategy coordinator communicatively coupled with a plurality of drilling subsystems, each subsystem having a local subsystem state; wherein the global strategy coordinator is configured to receive global state estimates determined at least in part from the plurality of local subsystem states and further configured to evaluate the global state estimates to determine an updated control strategy required to achieve a performance objective of the apparatus.

Statement 26: A drilling apparatus according to Statement 25, wherein the global strategy coordinator is further configured to transmit said updated control strategy to each of the plurality of drilling subsystems.

Statement 27: A drilling apparatus according to Statement 25 or Statement 26, wherein the global strategy coordinator is communicatively coupled with a global state estimator configured to determine global state estimates at least in part from the plurality of local subsystem states.

Statement 28: A drilling apparatus according to any one of the preceding Statements 25-27, wherein the updated control strategy comprises one selected from the group consisting of an updated objective function, an updated local control law, and an updated controller setting.

Statement 29: A drilling apparatus according to any one of the preceding Statements 25-28, wherein the plurality of drilling subsystems comprises a drilling fluid subsystem, a bottom hole assembly (BHA) subsystem, and a rig subsystem.

Statement 30: A drilling apparatus according to any one of the preceding Statements 25-29, wherein said communicatively coupled with comprises mud pulse telemetry.

Statement 31: A drilling apparatus comprising: a communication coordinator communicatively coupled with a plurality of drilling subsystems, each subsystem having a local subsystem state; wherein the communication coordinator is configured to receive local subsystem states from each of the plurality of drilling subsystems and transmit global state estimates to each of the plurality of drilling subsystems.

Statement 32: A drilling apparatus according to Statement 31, wherein the global state estimates comprises local state estimates for each of the plurality of subsystems.

Statement 33: A drilling apparatus according to Statement 31 or Statement 32, wherein each of the plurality of drilling subsystems comprises a subsystem controller configured to send command signals to one or more subsystem actuators based at least in part on the local subsystem state and the global state estimates, and wherein the communication coordinator is further configured to receive data comprising command signals sent by each of the subsystem controllers to one or more subsystem actuators.

Statement 34: A drilling apparatus according to any one of the preceding Statements 31-33, wherein the communication coordinator is further configured to transmit data comprising command signals, sent by each of the subsystem controllers to one or more actuators, to each of the subsystem controllers.

Statement 35: A drilling apparatus according to Statement 34, wherein the data transmitted by the communication coordinator comprises at least one selected from the group consisting of a sensing communication matrix and a interaction matrix.

Statement 36: A drilling apparatus according to any one of the preceding Statements 31-35, wherein the communication coordinator is communicatively coupled with a global state estimator configured to determine global state estimates at least in part from the plurality of local subsystem states.

Statement 37: A drilling apparatus according to any one of the preceding Statements 31-36, wherein the plurality of drilling subsystems comprises a drilling fluid subsystem, a bottom hole assembly (BHA) subsystem, and a rig subsystem.

Statement 38: A drilling apparatus according to any one of the preceding Statements 31-37, wherein said communicatively coupled with comprises mud pulse telemetry.

Statement 39: A method comprising: providing a drilling system comprising a plurality of subsystems, each subsystem comprising a subsystem controller communicatively coupled with one or more sensors and one or more actuators; determining, at each subsystem controller, a local subsystem state from measurements received from the one or more sensors; obtaining a global state estimate based at least in part on the local subsystem states and command signals sent by each subsystem controller to one or more actuators; evaluating the global state estimates to determine updated control strategies required to achieve the performance objective of the system; communicating the updated control strategies to each of the plurality of subsystem controllers; actuating, at each of the plurality of subsystems, one or more actuators to adjust a drilling subsystem control variable in response to the updated control strategies.

Statement 40: A method according to Statement 39, wherein the updated control strategy comprises and updated objective function.

Statement 41: A method according to Statement 39 or Statement 40, wherein the communicating comprises mud pulse telemetry.

Statement 42: A method according to any one of the preceding Statements 39-41, wherein the plurality of subsystems comprises a BHA subsystem, a rig subsystem, and a drilling fluid subsystem.

Statement 43: A method comprising: providing a drilling system comprising a plurality of subsystems, each subsystem comprising a subsystem controller communicatively coupled with one or more sensors and one or more actuators; determining, at each subsystem controller, a local subsystem state from measurements received from the one or more sensors; actuating, at each of the plurality of subsystems, one or more actuators to adjust a drilling subsystem control variable in response to a control action taken by a subsystem controller, obtaining, at an individual subsystem controller, global state estimates based at least in part on the local subsystem states and control actions taken by each of the subsystem controllers; evaluating, at the individual subsystem controller, the global state estimates to determine expected control actions of other subsystems; producing, at the individual subsystem controller, an uncorrected command signal based at least in part on the expected control actions of other subsystems; receiving, at the individual subsystem controller, the actual control actions of other subsystems; determining, at the individual subsystem controller, an estimated error based at least in part on the expected control actions of other subsystems and the actual control actions of other subsystems; generating, at the individual subsystem controller, a compensation signal based at least in part on the estimated error; adding the compensation signal to the uncorrected command signal to produce a corrected command signal; and actuating one or more actuators to adjust a drilling subsystem control variable in response to the corrected command signal.

Statement 44: A method according to Statement 43, further comprising: updating, at the individual subsystem controller, an evaluation algorithm used to determine the expected control actions of other subsystems based at least in part on the estimated error.

Statement 45: A drilling system comprising: a plurality of drilling subsystems, each drilling subsystem comprising: a subsystem controller; one or more sensors; and one or more actuators; wherein each subsystem controller is configured to determine a local subsystem state from measurements received from the one or more sensors; a communication coordinator communicatively coupled with each of the plurality of subsystem controllers and configured to receive local subsystem states from each of the plurality of subsystem controllers, the communication coordinator further configured to receive, from each of the plurality of subsystem controllers, command signals sent by each subsystem controller to one or more actuators; a global state estimator communicatively coupled with the communication coordinator and configured to determine global state estimates based at least in part on the local subsystem states and the command signals received from the communication coordinator, the global state estimator further configured to transmit global estimates to the communication controller; and a global strategy controller communicatively coupled with the global state estimator and each of the plurality of subsystem controllers, the global strategy controller configured to receive and evaluate the global state estimates to determine updated control strategies required to achieve the performance objective of the system, the global strategy controller further configured to transmit said updated control strategies to each of the plurality of subsystem controllers; wherein each subsystem controller sends command signals to the one or more actuators based at least in part on the local subsystem state, global state estimates received from the communication coordinator, and the updated control strategy.

Statement 46: A system according to Statement 45, wherein the communication coordinator is further configured to transmit data comprising command signals sent by each subsystem controller to each subsystem controller and global state estimates to each of the plurality of subsystem controllers, and wherein each subsystem controller sends command signals to the one or more actuators based at least in part on the local subsystem state, the updated control strategy, and data received from the communication coordinator.

Statement 47: A system according to Statement 46, wherein the data transmitted by the communication coordinator to each of the plurality of subsystem controllers comprises at least one selected from the group consisting of a sensing communication matrix and a interaction matrix.

Statement 48: A system according to any one of the preceding Statements 45-47, wherein the global state estimates comprises local state estimates for each of the plurality of subsystems.

Statement 49: A system according to any one of the preceding Statements 45-48, wherein the updated control strategies comprises one selected from the group consisting of an updated objective function, an updated local control law, and an updated controller setting.

Statement 50: A system according to any one of the preceding Statements 45-49, wherein the plurality of drilling subsystems comprises a drilling fluid subsystem, a bottom hole assembly (BHA) subsystem, and a rig subsystem.

Statement 51: A system according to any one of the preceding Statements 45-50, wherein said communicatively coupled with comprises mud pulse telemetry.

Statement 52: A system according to any one of the preceding Statements 45-51, wherein the plurality of subsystems comprises a bottom hole assembly (BHA) subsystem.

Statement 53: A system according to Statement 52, wherein the bottom hole assembly (BHA) subsystem comprises one or more sensors operable to measure a parameter selected from the group consisting of formation resistivity near the drill bit, formation gamma ray intensity, formation porosity, formation lithology, inclination of the drill string, azimuth of the drill string, downhole fluid pressure, shock, vibration, torque, revolutions per minute (RPM) of the fluid-driven motor, changes in torque or power of the fluid-driven motor, and drill string or drill bit telemetry.

Statement 54: A system according to Statement 52 or Statement 53, wherein the bottom hole assembly (BHA) subsystem comprises one or more actuators operable to control a parameter selected from the group consisting of well path, drill bit orientation, path or steering, and drill string orientation, path or steering.

Statement 55: A system according to any one of the preceding Statements 52-54, wherein the bottom hole assembly (BHA) subsystem comprises sensors selected form the group consisting of acoustic logging tools, neutron logging tools, gamma ray logging tools, density logging tools, photoelectron logging tools, and nuclear magnetic resonance (NMR) logging tools.

Statement 56: A system according to any one of the preceding Statements 52-55, wherein the bottom hole assembly (BHA) subsystem comprises a subsystem controller configured to transmit measurements obtained from the one or more sensors to a surface control unit.

Statement 57: A system according to any one of the preceding Statements 52-56, wherein the subsystem controller is configured to transmit measurements using one selected from the group consisting of mud pulse telemetry, wired communication, fiber optic communication, and wireless communication system.

Statement 58: A system according to any one of the preceding Statements 45-57, wherein the plurality of subsystems comprises a drilling fluid subsystem.

Statement 59: A system according to Statement 58, wherein the drilling fluid subsystem comprises one or more sensors operable to measure a parameter selected from the group consisting of drilling fluid flow rate or drilling fluid pump rate, volume of cuttings removed by cutting removal equipment, lithology of cuttings removed by cutting removal equipment, quantity of cuttings removed by cutting removal equipment, weight of cuttings removed by cutting removal equipment, density of cuttings removed by cutting removal equipment, shape or morphology of cuttings removed by cutting removal equipment, visual characteristics of cuttings removed by cutting removal equipment, particle size distribution (PSD) of cuttings removed by cutting removal equipment, weight or volume of fines removed by mud conditioning equipment, particle size distribution (PSD) of fines removed by mud conditioning equipment, drilling fluid rheology, drilling fluid density, mud equivalent circulating density (ECD), electrical stability of the drilling fluid, percent solids in the drilling fluid, oil/water ratio in the drilling fluid, drilling fluid pH, drilling fluid salinity, and particle size distribution (PSD) of the drilling fluid.

Statement 60: A system according to Statement 58 or Statement 59, wherein the drilling fluid subsystem comprises one or more actuators operable to control a parameter selected from the group consisting of drilling fluid pumping rate or drilling fluid flow rate, shaker screen desk angle, shaker vibration, shake G-force, cuttings conveyance velocity, drilling fluid composition, mud equivalent circulating density (ECD), drilling fluid additive supply valves, drilling fluid additive feed rate, and drilling fluid discharge rates.

Statement 61: A system according to any one of the preceding Statements 45-60, wherein the plurality of subsystems comprises a rig subsystem.

Statement 62: A system according to Statement 61, wherein the rig subsystem comprises one or more sensors operable to measure a parameter selected from the group consisting of revolutions per minute (RPM), weight-on-bit (WOB), torque-on-bit (TOB), rate of penetration (ROP), well depth, hook load, and standpipe pressure.

Statement 63: A system according to Statement 61 or Statement 62, wherein the rig subsystem comprises one or more actuators operable to control a parameter selected from the group consisting of revolutions per minute (RPM), weight-on-bit (WOB), torque-on-bit (TOB), rate of penetration (ROP), and hook load.

Statement 64: A drilling system control framework comprising: a cooperative game theory based distributed control strategy where the global system is divided into a plurality of subsystems, each subsystem comprising a subsystem controller; one or more sensors; and one or more actuators; a global strategy controller adjusts the local control law based on the global view of each subsystem's performance; a communication coordinator captures the communication matrix among the subsystem's controller and performance to coordinates the real-time local subsystem's controller actions; a co-player inference playing strategy instructs each subsystem controller to make correct action adjustments; each subsystem configured to contains a local controller comprising the functions of: implementing updated control strategies from global strategy controller based on the global state estimates; making independent local actions to achieve local control objectives; seeking to achieve a shared set of objectives designed by a global strategy coordinator; sending command signals to one or more local actuators; local subsystem states measurements are received from the one or more sensors and further provided to the global state estimator to perform global state estimation based on the full collection of subsystem states of each of the plurality of subsystems.

We claim:

1. A drilling apparatus comprising:
a plurality of subsystems, each subsystem comprising:
　a subsystem controller;
　one or more sensors;
　one or more actuators,
　each subsystem controller configured to determine a local subsystem state from measurements received from the one or more sensors and further configured to receive global state estimates based at least in part on the local subsystem states of each of the plurality of subsystems;
a communication coordinator communicatively coupled with each of the plurality of subsystem controllers, the communication coordinator configured to receive local subsystem states from each of the plurality of subsystem controllers and transmit global state estimates to each of the plurality of subsystem controllers, wherein each subsystem controller is configured to receive updated control strategies based at least in part on the global state estimates, each subsystem controller further configured to send command signals to one or more actuators based on the local subsystem state, global state estimates, and updated control strategy,
wherein the communication coordinator is further configured to receive data comprising command signals sent by each of the subsystem controllers to one or more subsystem actuators,
wherein the communication coordinator is further configured to transmit data comprising command signals, sent by each of the subsystem controllers to one or more actuators, to each of the subsystem controllers;
and a global state estimator communicatively coupled with the communication coordinator, the global state estimator configured to determine global state estimates based at least in part on the local subsystem states of each of the plurality of subsystems and the command signals sent by each of the subsystem controllers to one or more actuators, the global state estimator further configured to transmit the global state estimates to the communication coordinator, the communication coordinator configured to transmit the global state estimates to each of the plurality of subsystem controllers.

2. The drilling apparatus according to claim 1, wherein each subsystem controller is further configured to receive data comprising command signals sent by each of the subsystem controllers to one or more actuators, and wherein each subsystem controller is further configured to send command signals to one or more actuators based on the local subsystem state, global state estimates, updated control strategy, and command signals sent by each of the subsystem controllers.

3. The drilling apparatus according to claim 1, wherein the data transmitted by the communication coordinator comprises at least one selected from the group consisting of a sensing communication matrix and an interaction matrix.

4. The drilling apparatus according to claim 1, further comprising a global strategy controller communicatively coupled with the global state estimator and each of the plurality of subsystem controllers, the global strategy controller configured to receive and evaluate the global state estimates to determine updated control strategies required to achieve a performance objective of the apparatus, the global strategy controller further configured to transmit said updated control strategies to the plurality of subsystem controllers.

5. The drilling apparatus according to claim 4, wherein the updated control strategies comprises one selected from the group consisting of an updated objective function, an updated local control law, and an updated controller setting.

6. The drilling apparatus according to claim 1, wherein the plurality of subsystems comprises a drilling fluid subsystem, a bottom hole assembly (BHA) subsystem, and a rig subsystem.

7. A method comprising:
providing a drilling system comprising a plurality of subsystems, each subsystem comprising a subsystem controller communicatively coupled with one or more sensors and one or more actuators;
determining, at each subsystem controller, a local subsystem state from measurements received from the one or more sensors;
obtaining a global state estimate based at least in part on the local subsystem states and command signals sent by each subsystem controller to one or more actuators;
evaluating the global state estimates to determine updated control strategies required to achieve the performance objective of the system;
communicating the updated control strategies to each of the plurality of subsystem controllers;
actuating, at each of the plurality of subsystems, one or more actuators to adjust a drilling subsystem control variable in response to the updated control strategies.

8. The method according to claim 7, wherein the updated control strategy comprises an updated objective function.

9. The method according to claim 7, wherein the communicating comprises mud pulse telemetry.

10. The method according to claim 7, wherein the plurality of subsystems comprises a BHA subsystem, a rig subsystem, and a drilling fluid subsystem.

11. A drilling system comprising:
a plurality of drilling subsystems, each drilling subsystem comprising:
a subsystem controller;
one or more sensors; and
one or more actuators;
wherein each subsystem controller is configured to determine a local subsystem state from measurements received from the one or more sensors;
a communication coordinator communicatively coupled with each of the plurality of subsystem controllers and configured to receive local subsystem states from each of the plurality of subsystem controllers, the communication coordinator further configured to receive, from each of the plurality of subsystem controllers, command signals sent by each subsystem controller to one or more actuators;
a global state estimator communicatively coupled with the communication coordinator and configured to determine global state estimates based at least in part on the local subsystem states and the command signals received from the communication coordinator, the global state estimator further configured to transmit global estimates to a communication controller; and
a global strategy controller communicatively coupled with the global state estimator and each of the plurality of subsystem controllers, the global strategy controller configured to receive and evaluate the global state estimates to determine updated control strategies required to achieve the performance objective of the system, the global strategy controller further configured to transmit said updated control strategies to each of the plurality of subsystem controllers;
wherein each subsystem controller sends command signals to the one or more actuators based at least in part on the local subsystem state, global state estimates received from the communication coordinator, and the updated control strategy.

12. The drilling system according to claim 11, wherein the communication coordinator is further configured to transmit data comprising command signals sent by each subsystem controller to each subsystem controller and global state estimates to each of the plurality of subsystem controllers, and wherein each subsystem controller sends command signals to the one or more actuators based at least in part on the local subsystem state, the updated control strategy, and data received from the communication coordinator.

13. The drilling system according to claim 12, wherein the data transmitted by the communication coordinator to each of the plurality of subsystem controllers comprises at least one selected from the group consisting of a sensing communication matrix and a interaction matrix.

14. The drilling system according to claim 11, wherein the updated control strategies comprises one selected from the group consisting of an updated objective function, an updated local control law, and an updated controller setting.

15. The drilling system according to claim 11, wherein the plurality of drilling subsystems comprises a drilling fluid subsystem, a bottom hole assembly (BHA) subsystem, and a rig subsystem.

16. A method comprising:
providing a drilling system comprising a plurality of subsystems, each subsystem comprising a subsystem controller communicatively coupled with one or more sensors and one or more actuators;
determining, at each subsystem controller, a local subsystem state from measurements received from the one or more sensors;
actuating, at each of the plurality of subsystems, one or more actuators to adjust a drilling subsystem control variable in response to a control action taken by a subsystem controller, obtaining, at an individual subsystem controller, global state estimates based at least in part on the local subsystem states and control actions taken by each of the subsystem controllers;
evaluating, at the individual subsystem controller, the global state estimates to determine expected control actions of other subsystems;
producing, at the individual subsystem controller, an uncorrected command signal based at least in part on the expected control actions of other subsystems;
receiving, at the individual subsystem controller, the actual control actions of other subsystems; determining, at the individual subsystem controller, an estimated error based at least in part on the expected control actions of other subsystems and the actual control actions of other subsystems;
generating, at the individual subsystem controller, a compensation signal based at least in part on the estimated error;
adding the compensation signal to the uncorrected command signal to produce a corrected command signal; and
actuating one or more actuators to adjust a drilling subsystem control variable in response to the corrected command signal.

* * * * *